United States Patent [19]
Kanbara et al.

[11] Patent Number: 6,043,975
[45] Date of Patent: Mar. 28, 2000

[54] CAPACITORS USING ION CONDUCTIVE POLYMER ELECTROLYTE

[75] Inventors: Teruhisa Kanbara, Ikeda; Tooru Matsui, Fujiidera; Kenichi Takeyama, Osaka, all of Japan

[73] Assignee: Matsushita Electric Industrial Co., Ltd., Osaka-fu, Japan

[21] Appl. No.: 09/294,553

[22] Filed: Apr. 20, 1999

Related U.S. Application Data

[62] Division of application No. 08/540,681, Oct. 11, 1995, Pat. No. 5,900,182.

[30] Foreign Application Priority Data

Oct. 17, 1994 [JP] Japan ..................................... 6-251060
Oct. 18, 1994 [JP] Japan ..................................... 6-252140
Mar. 24, 1995 [JP] Japan ..................................... 7-65836

[51] Int. Cl.[7] .............. H01G 9/00; H01G 9/02; H01B 1/12; H01M 6/18; H01M 10/40
[52] U.S. Cl. .................. 361/502; 361/505; 361/525; 252/62.2; 429/190; 429/191; 429/192; 429/194; 429/195; 429/198
[58] Field of Search .................... 361/502, 505, 361/509, 525, 529; 252/62.2; 429/192, 191, 190, 194, 195, 198; 526/260, 312, 320, 314

[56] References Cited

U.S. PATENT DOCUMENTS 4,499,520  2/1985  Cichanowski .
4,513,349  4/1985  Olson et al. .
4,586,111  4/1986  Cichanowski .
4,647,396  3/1987  Denzinger et al. ...................... 510/156
4,698,174  10/1987  Denzinger et al. ...................... 510/533
5,168,433  12/1992  Mukouyama et al. .
5,275,750  1/1994  Sato et al. ............................... 252/62.2

FOREIGN PATENT DOCUMENTS 60-212410  10/1985  Japan .
4-073803   3/1992   Japan .
4-350919   12/1992  Japan .
6-223842   8/1994   Japan .

OTHER PUBLICATIONS

Derwent Abstract #92–128970, Mar. 1992 for JP 4–73803.

Derwent Abstract #94–297351, Aug. 1994 for JP 6–223842.

*Primary Examiner*—Kristine Kincaid
*Assistant Examiner*—Anthony Dinkins
*Attorney, Agent, or Firm*—Akin, Gump, Strauss, Hauer & Feld, L.L.P.

[57] ABSTRACT

An ion-conductive polymer electrolyte having a high ionic conductivity and a high stability in both of physical and chemical properties is disclosed. It has a polymer containing at least one monomer selected from the group containing of a hydroxyalkyl acrylate, a hydroxyalkyl methacrylate and vinylene carbonate as its polymerizable ingredient, and at least one electrolyte salt. An aluminum electrolytic capacitor and an electric double-layer capacitor configured with the electrolyte are also disclosed.

11 Claims, 17 Drawing Sheets

CAPACITORS USING ION CONDUCTIVE POLYMER ELECTROLYTE

CROSS-REFERENCE TO RELATED APPLICATION

This is a division of application Ser. No. 08/540,681, filed on Oct. 11, 1995, now U.S. Pat. No. 5,900,182.

BACKGROUND OF THE INVENTION

1. Field of the Invention

The present invention relates to an ion-conductive polymer electrolyte and a method for producing the same, and further relates to an electrolytic capacitor as well as an electric double-layer capacitor configured with the same electrolyte for driving the capacitors.

2. Description of the Prior Art

Conventionally, as an electrolyte for driving an electrolytic capacitor, a solution prepared by dissolving an ammonium salt as a main solute in an organic solvent such as ethylene glycol has been used. However, there has been a possibility of leakage and escape of the electrolyte by evaporation in the capacitor using such liquid electrolyte, and hence it has been difficult to obtain a long-term reliability in operation in such capacitor.

In order to solve these problems, there has been proposed an electrolytic capacitor free from the leakage and escape of the electrolyte by evaporation, configured by solidifying the capacitor element with the use of an ion-conductive polymer electrolyte composed of a mixture of siloxane-alkylene oxide copolymer and polyethylene oxide, as its mother ingredient, and an alkali metal salt, instead of the liquid electrolyte.

However, the electrolytic capacitor using the ion-conductive polymer electrolyte with alkali metal ions as its mobile ions has a disadvantage that the alkali metal ions are liable to diffuse into a dielectric substance layer formed on an anode of the electrolytic capacitor, and the thus diffused alkali metal ions might sometimes cause a lowering of the dielectric constant of the dielectric substance layer, and finally invites a short-circuiting in the capacitor.

In order to overcome such disadvantages and deficiencies, it has been considered to use ammonium ions in place of the alkali metal ions which had been used as the mobile ions of the electrolyte for the electrolytic capacitor. However, it has hitherto been known that the ion-conductive polymer electrolyte which contains ammonium ions has a very low ionic conductivity in general.

All of the various polymer electrolytes which have hitherto been proposed have a disadvantage that their ionic conductivity seriously decreases when their operating temperature is lowered from room temperature to 0° C. or lower.

When such an electrolyte having a low ionic conductivity is used for a capacitor, the impedance of the capacitor element becomes large. And, the application of such capacitor is drastically limited because of its power loss and heat generated during the operation. Thus, the electrolyte is difficult to use from the practical point of view.

In order to enable the use of such an ion-conductive polymer electrolyte for driving an electrolytic capacitor, it is essential to clarify a suitable combination of various polymer mother ingredients with electrolyte salts for realizing an electrolyte of high ionic conductivity, but no concrete or specific example has not been clarified so far.

In addition, the application of the aluminum electrolytic capacitor has recently been expanded widely, and its long-term stability or reliability during high-temperature storing has been attracting attention in this art. For instance, a guaranteed quality for the continuous exposure for 10,000 hours at 105° C. is required by the current market. When the polymer electrolytes are exposed to such high temperature atmosphere, a physical and/or chemical deterioration such as crack, contraction or dissolution may be produced, and thus the exposure may cause a serious deterioration in the characteristics of the capacitor element. A solid electrolyte which does not suffer from any deterioration in its performance under such severe test environments has not been proposed yet.

Recently, an electric double-layer capacitor configured with an electrolyte comprising sulfuric acid or an organic electrolyte has been employed for various electric or electronic appliances. An electric double-layer capacitor configured with an electrolyte comprising sulfuric acid has a disadvantage that its decomposition voltage is as low as about 1.2 V, which is lower than an electrolysis voltage of water, but the conductivity of the electrolyte is as high as 0.7 S/cm. By utilizing this characteristic, the electric double-layer capacitors are employed for such applications wherein a relatively large output current is required, for instance, for emergency power source in case of a cut-off of usual power source (see, for instance, NEC's Technical Report, Vol.44, No.10, 1991).

On the other hand, an electric double-layer capacitor configured with an electrolyte comprising an organic electrolyte composed of, for instance, propylene carbonate as the solvent and tetraethylammonium perchlorate as the solute has a decomposition voltage of 2.4 V, which is twice as high as that of the capacitor with sulfuric acid. The ionic conductivity of the electrolyte is 0.01 S/cm, which is lower by about two orders as compared with that of the sulfuric acid. By utilizing this characteristic, the electric double-layer capacitor configured with an organic electrolyte has been employed as, for instance, a back-up power source for semiconductor memories in miniature electronic appliances (Carbon, No.132, pp.57, 1988).

The capacitor configured with such liquid electrolyte is however liable to cause a leakage of its electrolyte, and thus a capacitor configured with a solid polymer electrolyte has been proposed as the one essentially free from the leakage.

The configuration of such capacitor is exemplified as one wherein an electrode is produced by impregnating a porous carbon material with an electrolyte of polyvinyl alcohol solution containing a lithium salt such as lithium perchlorate (J. Power Sources, 36, pp.87, 1991), or one wherein an electrode is produced by mixing an electrolyte of polyethylene oxide containing an alkali metal salt such as lithium perchlorate with activated carbon (Japanese Laid-Open Patent Publication No. Hei 2-39513).

As described previously, there has currently been proposed a solid electrolyte configured with a base polymer containing a lithium salt such as lithium perchlorate, as a typical configuration of the solid polymer electrolyte having a relatively high conductivity. However, if an electrolyte is configured with an alkali metal salt such as lithium perchlorate for assembling a capacitor element, it is indispensable to completely remove water from the rest of the components constituting the capacitor element. It is very difficult to completely remove water from the porous carbon such as activated carbon which is a structural component of the electrode and to assemble the capacitor element in the completely water free state. From the practical point of view, the difficulty in the assembling process has also hindered a realization of such a capacitor so far.

At present, a sealing operation of a thin-type capacitor element has been performed using a compound material composed of a metal foil such as aluminum foil having an inner face laminated with a layer of electrically insulating sheet made of, for instance polypropylene, in general. However, the present inventors have confirmed that if a sealing of such a structure is performed on a capacitor element configured with the above-mentioned lithium salt electrolyte and the sealed capacitor element is stood still under such an atmosphere at a temperature of 60° C. and a relative humidity of 90%, deterioration in the performance of the capacitor element appears after about two months. The cause for the deterioration is considered to be water which gradually invades the capacitor element through the sealing material.

As a means for solving these problems, there has been considered an employment of an ammonium salt, which is the same as that used in the above-mentioned organic electrolyte, as the salt for configuring the solid polymer electrolyte. The ammonium salts in general are however difficult to be dissolved in the polymer compound such as the above-mentioned polyvinyl alcohol and polyethylene oxide in a large quantity. As a result, the ionic conductivity of the polymer electrolyte configured with an ammonium salt and polyethylene oxide is very low (Naoya Ogata: "DODENSEI KOHBUNSHI (Electrically-Conductive Polymer)", KOHDANSHA Scientific, 1990).

The ionic conductivity of the electrolyte constituting the electric double-layer capacitor acts as a resistance of the capacitor, and when the ionic conductivity of the electrolyte is too small, only weak output current is obtained, and the use of such electrolyte in the electric double-layer capacitor is difficult from the practical point of view.

More important fact is that the capacitance of the electric double-layer capacitor is directly proportional to the concentration of ions in the electrolyte, and there is a problem that the capacitance of the electric double-layer capacitor can not be made large if it is configured with the electrolyte containing such a small amount of ammonium salt.

In addition, the electrolyte salt employed in the electric double-layer capacitor is required to creep into micropores of about several tens of angstrom in size existing in the porous carbon, which is a structural component of the electrode, and thus the electrolyte should be in such a molecule that produces ions having a radius as small as possible. However, it is well known that the smaller the size of the anion and cation of the salt is, the harder to dissolve the salt in the base prepolymer (KISODENKIKAGAKU SOKUTEIHOU (Fundamental Measurement in Electrochemistry) issued from Electrochemical Society of Japan, pp.30, 1981).

Thus, the use of a polymer electrolyte containing a lithium salt in the electric double-layer capacitor poses a problem of complicated water removal in the manufacturing process and necessarily requires a water-tight sealing material under an atmosphere of high temperature and high humidity.

When a polymer electrolyte containing an ammonium salt is employed as the electrolyte for the capacitor as a means for solving such problems, it is very important to realize an electrolyte having a high ionic conductivity, by dissolving a large quantity of salt having a smaller cation/anion radius in the polymer, and by selecting a suitable combination of the polymer mother ingredient with the ammonium salt; however, no concrete or specific configuration which fulfills all of the above-mentioned requirements has not been proposed so far.

SUMMARY OF THE INVENTION

The primary object of the present invention is to provide an ion-conductive polymer electrolyte having a sufficient ionic conductivity and a very high stability in both physical and chemical aspects.

Another object of the present invention is to provide an aluminum electrolytic capacitor and an electric double-layer capacitor having an equivalent electric characteristic to those employing the liquid electrolyte and a very high reliability which can not be realized with the prior art liquid electrolyte.

The present invention provides an ion-conductive polymer electrolyte comprising a polymer containing at least one monomer selected from the group consisting of a hydroxyalkyl acrylate, a hydroxyalkyl methacrylate and vinylene carbonate as its polymerizable ingredient, and at least one electrolyte salt.

In the above-mentioned ion-conductive polymer electrolyte, although the hydroxyalkyl acrylate and the hydroxyalkyl methacrylate having an alkyl group containing one to five carbon atoms are employed, those having an alkyl group containing two or three carbon atoms are preferred. Among these, ones having an alkyl group containing two carbon atoms are most preferred.

As the above-mentioned polymer, there are a homopolymer of the above-mentioned monomer, and a copolymer of the above-mentioned monomer and an electrolyte salt having a polymerizable double bond in its molecule.

As the electrolyte salt contained in the ion-conductive polymer electrolyte in accordance with the present invention, at least one member selected from the group consisting of an ammonium carboxylate, an ammonium dicarboxylate, a morpholinium dicarboxylate, a quaternary ammonium carboxylate and a quaternary ammonium dicarboxylate is preferable. The electrolyte salt may be the same as that constituting the above-mentioned copolymer.

As the electrolyte salt having a polymerizable double bond in its molecule, a maleate or a fumarate is preferably employed. It is also preferable that a copolymerization molar ratio (electrolyte salt/monomer) of the copolymer is 0.1 or larger, and an average molecular weight of the copolymer is 1,000 or larger and 1,000,000 or smaller.

It is preferable that the ion-conductive polymer electrolyte containing the above-mentioned copolymer as its mother ingredient further comprises at least one salt selected from the group consisting of quaternary ammonium hydrogen maleate, N,N-dimethylmorpholinium hydrogen maleate, quaternary ammonium hydrogen fumarate and N,N-dimethylmorpholinium hydrogen fumarate, as its electrolyte salt.

The present invention also provides a method for producing an ion-conductive polymer electrolyte comprising the steps of dissolving an electrolyte salt in at least one monomer selected from the group consisting of a hydroxyalkyl acrylate, a hydroxyalkyl methacrylate and vinylene carbonate to obtain a solution and curing the solution by irradiation of an active ray or by heating.

When the above-mentioned electrolyte salt is a compound having a polymerizable double bond in its molecule, like a maleate or a fumarate, the above-mentioned electrolyte salt cures to form a copolymer with the above-mentioned monomer by irradiation of the active ray or heating. On the other hand, when the above-mentioned electrolyte salt is a compound having no polymerizable double bond in its molecule, the above-mentioned monomer cures by itself to form a homopolymer by irradiation of the active ray or heating.

The present invention also provides capacitors provided with the above-mentioned ion-conductive polymer electrolyte.

More specifically, an aluminum electrolytic capacitor which comprises a cathode made of aluminum, an anode having a dielectric substance layer made of aluminum oxide, and an electrolyte layer of the ion-conductive polymer electrolyte interposed between both electrodes.

Another capacitor is an electric double-layer capacitor comprising a pair of polarizable electrodes containing at least activated carbon, and an electrolyte layer of an ion-conductive polymer electrolyte interposed between both electrodes.

The polymer used in the ion-conductive electrolyte in the electric double-layer capacitor of the present invention is preferably a copolymer of an ammonium maleate or a quaternary ammonium maleate and the above-mentioned monomer, and copolymerization molar ratio (an ammonium maleate or a quaternary ammonium maleate/monomer) of the copolymer is 0.5 or larger.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Figure 1:
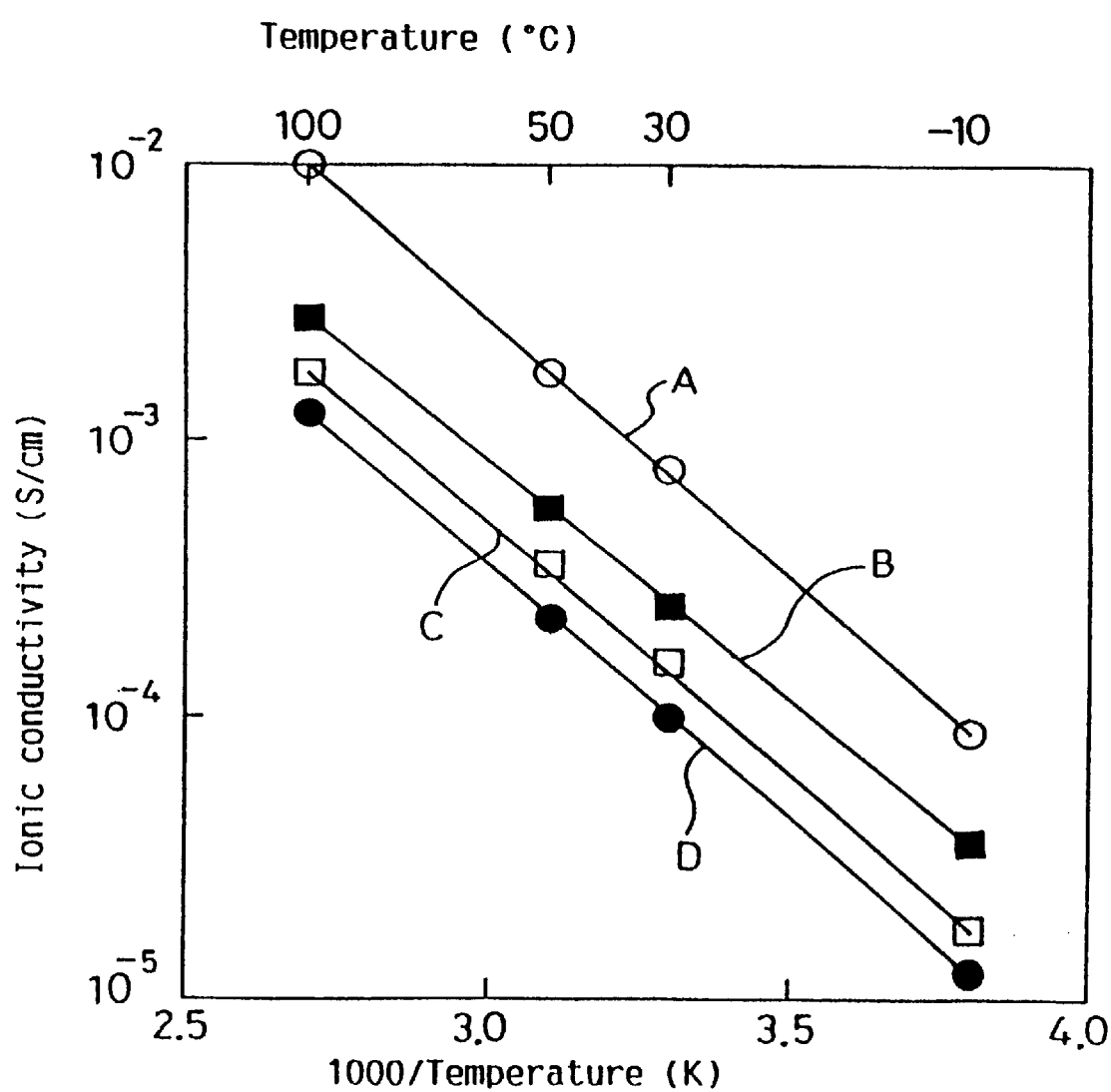
FIG. 1 is a diagram showing a temperature characteristic of the ionic conductivity of the ion-conductive polymer electrolyte in accordance with Example 1.

The hydroxyalkyl acrylates, hydroxyalkyl methacrylates and vinylene carbonate are usually liquid in their monomer state, but can be solidified by polymerization reaction if a polymerization initiator is added to the mixture and the mixture is irradiated with an active ray such as ultraviolet ray, or heated. The hydroxyalkyl acrylates and the hydroxyalkyl methacrylates can dissolve various electrolyte salts by an action of their terminal group (end residue) OH, and demonstrate an ionic conductivity. On the other hand, the vinylene carbonate can dissolve various electrolyte salts by an action of its terminal group (end residue) C=O, and demonstrate an ionic conductivity.

When one of the electrolyte salts is dissolved in any of the hydroxyalkyl acrylates, the hydroxyalkyl methacrylates and the vinylene carbonate, a solid electrolyte having an ionic conductivity can be obtained, if only the dissolved mixture is solidified by irradiation of the active ray or by heating. When solidified, most liquid electrolytes having a high ionic conductivity lose their conductivity and their ionic conductivity decreases to an extremely small value. According to the present invention, however, it is possible to obtain a solid electrolyte having a sufficient ionic conductivity from the practical point of view.

Ammonium carboxylates, ammonium dicarboxylates, quaternary ammonium carboxylates and quaternary ammonium dicarboxylates can be employed as the electrolyte salt as far as they can be dissolved in either one of the hydroxyalkyl acrylates, hydroxyalkyl methacrylates and vinylene carbonate. If the resultant electrolyte is mainly used for driving an aluminum electrolytic capacitor, the quaternary ammonium maleate and morpholinium maleate are specifically useful for the hydroxyalkyl acrylates and hydroxyalkyl methacrylates. When an aluminum electrolytic capacitor is produced from the electrolyte configured with any of these salts, it is possible to realize an aluminum electrolytic capacitor that has an impedance characteristic practically sufficient for a medium or high voltage capacitor, and an overwhelming high temperature reliability.

Quaternary ammonium maleate, morpholinium maleate, quaternary ammonium oxalate, quaternary ammonium azipate, quaternary ammonium azelate, quaternary ammonium benzoate, quaternary ammonium formate, quaternary ammonium citrate, quaternary ammonium succinate, quaternary ammonium salicylate, quaternary ammonium tartarate, ammonium sebacate, ammonium borodisalicylate, ammonium γ-resorcilate, ammonium lactate, ammonium glycolate and ammonium diphenylacetate are particularly useful for vinylene carbonate. When an aluminum electrolytic capacitor is produced from the electrolyte configured with any of these salts, it is possible to realize an aluminum electrolytic capacitor that has an impedance characteristic practically sufficient for a low voltage capacitor, and an overwhelming high temperature reliability.

The ion-conductive polymer electrolyte in accordance with the present invention has a configuration, such that the above-mentioned homopolymer or copolymer is included as the mother ingredient and the electrolyte salt is dispersed in the mother ingredient. Ions dissociated from the electrolyte salt participate in the conduction. In case that the mother ingredient is the copolymer, the electrolyte salt may not necessarily be the same as that employed in the polymerization, but may be the other ones that are specially added to the copolymer.

In general, the ionic conductivity of an electrolyte is directly proportional to the product of the concentration and the mobility of the dissociated ions. In order that the ion-conductive polymer electrolyte in accordance with the present invention has a sufficient ionic conductivity and a high stability physically and chemically, it is preferable that the following requirements should be fulfilled.

(1) The dielectric property of the monomer should be made high, and, when the electrolyte salt is dissolved in the monomer, the electrolyte salt should be ionically dissociated into cations and anions, and maintain a high concentration of those ions.

(2) Anions in the electrolyte salt should be bonded to the monomer by the copolymerization reaction and have a high physical and chemical stability.

The polymer electrolytes in accordance with the present invention fulfill the above-mentioned requirement (1), and those configured by employing the copolymer fulfill the above-mentioned requirement (2). For instance, in the above-mentioned monomer, the polymerizable double bond is represented by an acryloyl group ($CH_2=CHCOO-$), and a functional group for demonstrating the high dielectric property is represented by a hydroxyethyl group ($-C_2H_4OH$), respectively. Furthermore, in the above-mentioned electrolyte salt, a group having a polymerizable double bond in its molecule after being ionically dissociated is represented by the double bond ($C=C$) in the molecule of maleic acid or fumaric acid.

When the monomer is mixed with the electrolyte salt, the electrolyte salt produces an ionically dissociated state by itself, wherein the salt is separated into an anion moiety containing maleic acid, and a cation moiety containing ammonium salt, because of a high dielectric property induced by the hydroxyethyl group in the hydroxyethyl acrylate. When the mixture is irradiated with an active ray such as ultraviolet ray or electron beam in this state, the acryloyl group in the monomer is allowed to react with the $C=C$ double bond in the anion moiety of the electrolyte salt for promoting the copolymerization, and forms a polymer compound (wherein q=2) represented by the following formula (1):

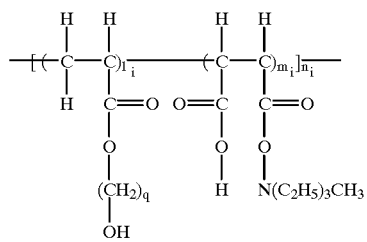

(wherein each of $l_i$, $m_i$ and $n_i$ is an integer of 1 or larger, and q is an integer of 1–5).

It is possible to configure the polymer electrolyte in accordance with the present invention by using the above-identified polymer compound as its skeletal structure and the dissociated ions as its conductive species, respectively.

Further, as described previously, any of the temperature characteristics in the ionic conductivities of the polymer electrolytes which have conventionally been proposed produces an upwardly convex curve in a diagram composed of an ordinate representing logarithm of the ionic conductivity and an abscissa representing reciprocal number of the absolute temperature (an Arrhenius Plot of the ionic conductivity), and thus the decreasing rate in the ionic conductivity is large particularly in its low temperature region.

In contrast to this, it is found that the polymer electrolyte in accordance with the present invention demonstrates a favorable linearity in the above-mentioned Arrhenius Plot. This favorable linearity is considered due to an action of the —OH group in the skeletal structure of the electrolyte in accordance with the present invention to improve the transportability of the ions.

This action is similarly obtained in the use of the vinylene carbonate as the monomer. In this case, the $C=O$ group in the vinylene carbonate molecule may act as a functional group having a high dielectric property, and demonstrates an action similar to that of the —OH group in the above-mentioned hydroxyethyl acrylate.

In addition, it is found that when the ion-conductive polymer electrolyte is employed for driving an aluminum electrolytic capacitor and if the electrolyte contains water in an amount which does not exceed 10 wt %, the working voltage of the obtained capacitor is improved. It is believed that improved working voltage is caused by an improved oxide film-restoring property of the aluminum electrode brought by the addition of water.

Moreover, an electric double-layer capacitor configured with the electrolyte in accordance with the present invention can have an unprecedently high capacitance because the electrolyte contains ions in a large quantity. The electric double-layer capacitor has a remarkably high reliability as compared with the prior art capacitor element configured with a liquid electrolyte because the electrolyte in accordance with the present invention contains no liquid component. The present invention therefore realizes a larger capacitance and a higher working voltage for an electric double-layer capacitor.

In the following paragraphs, the present invention will be described in more detail by way of specific examples.

Ion-Conductive Polymer Electrolyte

EXAMPLE 1

A description is made on an ionic conductivity and a reliability in high temperature storing of an ion-conductive polymer electrolyte constituted with hydroxyethyl acrylate and a maleic acid salt.

First, respective solutions were prepared by dissolving one of the maleic acid salts listed in Table 1 below, together with their amounts to be added, in each 10 g of hydroxyethyl acrylate. Next, 100 mg of benzyldimethylketal was added to each of the solutions as a polymerization initiator, and well dissolved while stirring. Then, each of the obtained mixtures was spread over a tray made of stainless steel in a thickness of 0.5 mm and irradiated with ultraviolet ray using a high-pressure mercury lamp of 5 J in the air, and then heated at 100° C. for 1 hour to obtain an ion-conductive polymer electrolyte sheet.

Temperature characteristics in the ionic conductivities of the respective polymer electrolytes prepared in the above-mentioned manner were evaluated by means of the known complex impedance method. The results of the measurements are shown in FIG. 1.

Figure 2:
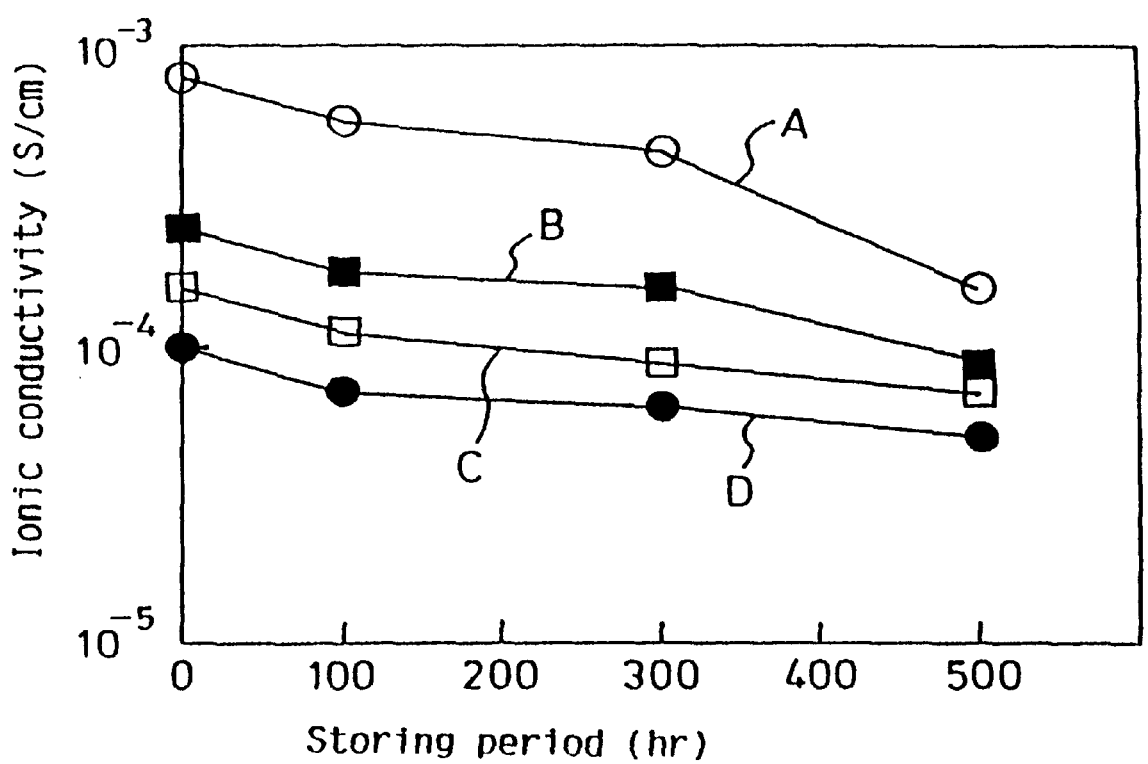
FIG. 2 is a diagram showing a high temperature storing characteristic of the ionic conductivity of the ion-conductive polymer electrolyte in accordance with Example 1.

Changes by aging in the ionic conductivities after storing of the electrolytes in a non-sealed state in the air at 105° C. were also measured in order to evaluate the reliability in the high temperature storing. FIG. 2 shows the results of the measurements. Sample electrolytes used in the evaluation are polymer electrolyte sheets each finished in a disk having a diameter of 13 mm and a thickness of 0.5 mm, and the measurement of the ionic conductivity was performed at 30° C.

FIG. 1 is a diagram representing Arrhenius Plots of the conductivities. The ordinate represents logarithm of the ionic conductivity and the abscissa represents reciprocal number of the absolute temperature. As clearly shown in FIG. 1, according to the present invention, it is possible to configure a polymer electrolyte having an unprecedently high conductivity of $1 \times 10^{-4}$ S/cm or higher at room temperature, or $1 \times 10^{-5}$ S/cm or higher even at $-10°$ C.

As clearly shown in FIG. 2, each of the obtained polymer electrolytes maintains an ionic conductivity of 20% of its initial value or higher after storing for 500 hours, even under very severe conditions in the non-sealed state at high temperature (105° C.).

TABLE 1

| Sample | Salt | Amount (g) |
|--------|------|------------|
| A | Triethylmonomethyl-ammonium hydrogen maleate | 20 |
| B | Trimethylmonoethyl-ammonium hydrogen maleate | 10 |
| C | Tetraethylammonium hydrogen maleate | 10 |
| D | N,N-dimethylmorpholinium maleate | 10 |

In this example, benzyldimethylketal was used as the polymerization initiator and the polymerization was performed by irradiating the mixture with the ultraviolet ray. The polymerization reaction may alternatively be performed by heating the mixture. For instance, a polymer electrolyte was prepared by adding 10 mg of α, α'-azobisisobutyronitrile to the mixture in place of benzyldimethylketal as the polymerization initiator and heating the mixture at 80° C. under a nitrogen gas atmosphere for 20 hours, and the thus prepared polymer electrolyte had similar technical advantages in the ionic conductivity and in the high temperature storing characteristic to those obtained by the ultraviolet irradiation.

Finally, the structure of the above-mentioned electrolyte was examined by nuclear magnetic resonance (hereinafter referred to as NMR) spectrometry and analysis of the elements, carbon, hydrogen and nitrogen (hereinafter referred to as CHN analysis). As a result, it was found that the above-mentioned electrolyte forms a skeletal structure of a copolymer of hydroxyethyl acrylate and triethylmonomethylammonium hydrogen maleate, in which hydrogen maleate ions and triethylmonomethylammonium ions serve as the conductive species. FIG. 3, FIG. 4, FIG. 5 and FIG. 6 show data of the NMR spectra and the CHN analysis of the above-mentioned sample A.

Figure 3:
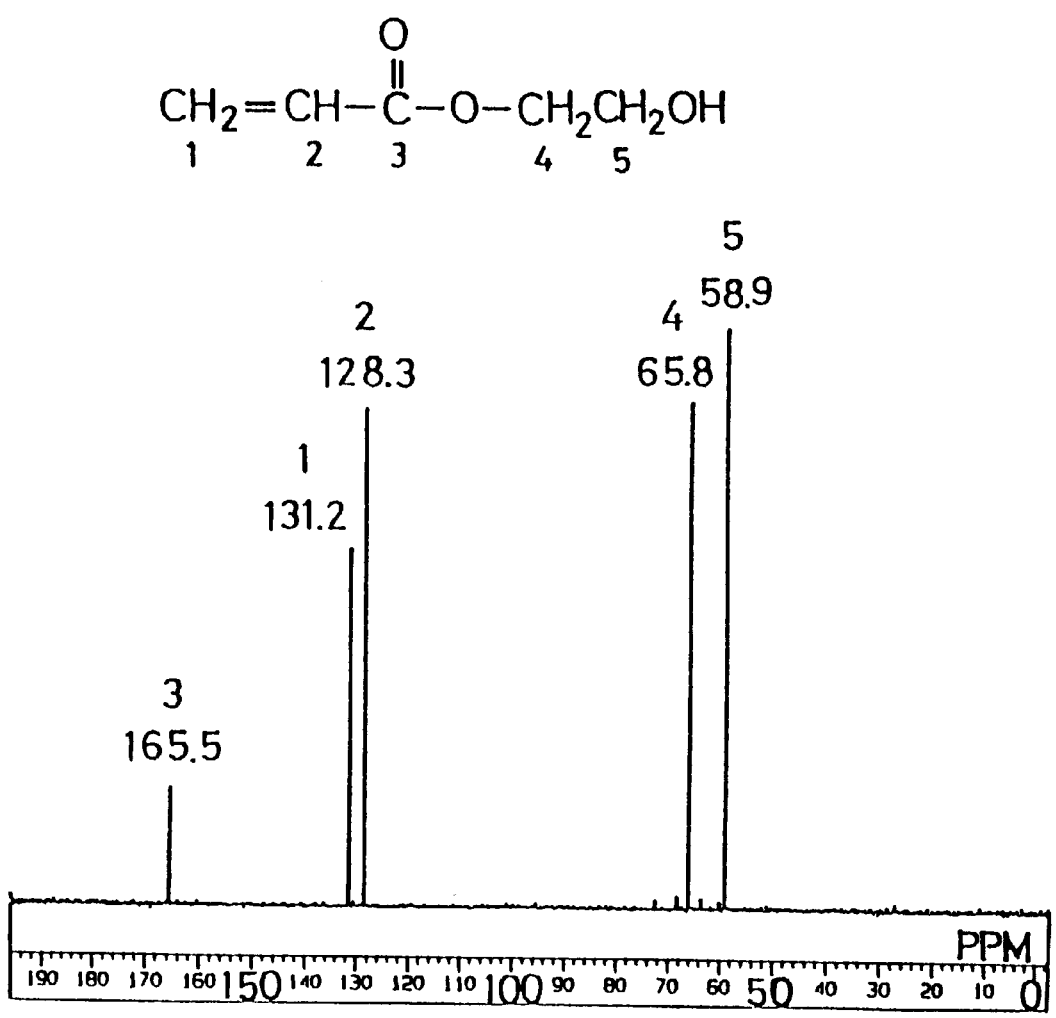
FIG. 3 is a diagram showing an NMR spectrum of hydroxyethyl acrylate which is a monomer used in the embodiments of the present invention.
Figure 4:
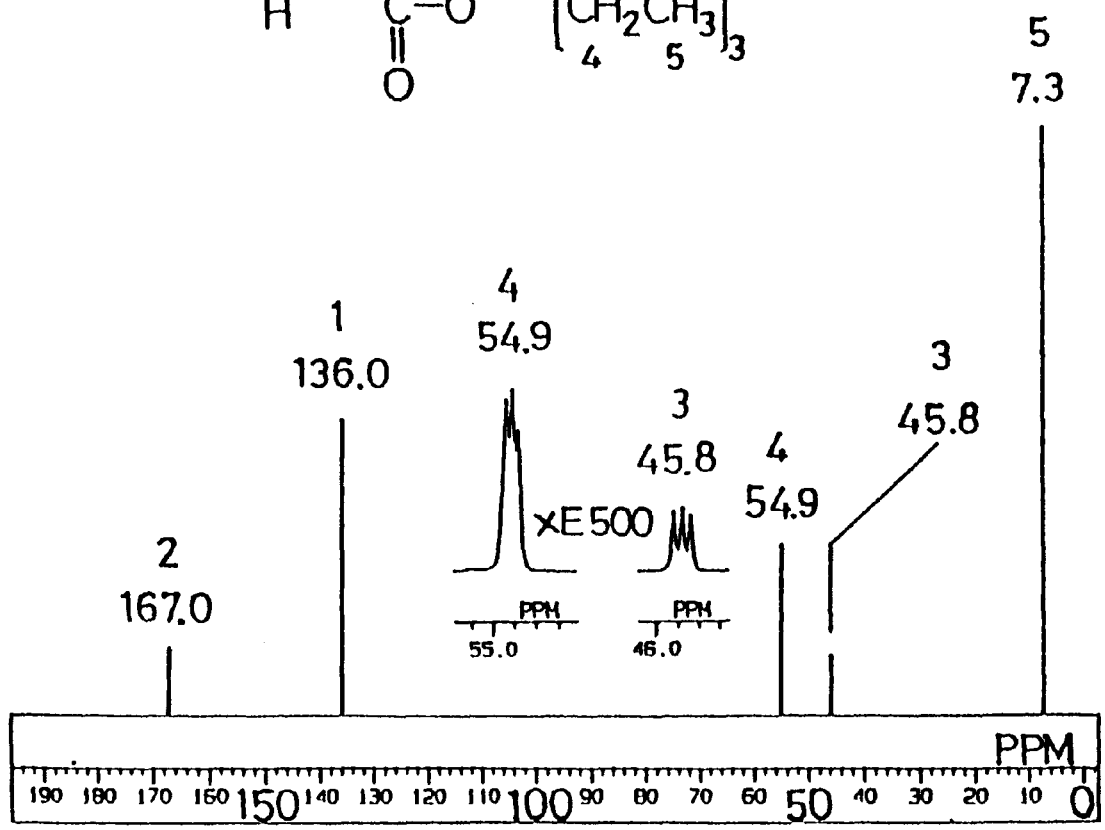
FIG. 4 is a diagram showing an NMR spectrum of triethylmonomethylammonium maleate which is an electrolyte salt used in the embodiments of the present invention.
Figure 5:
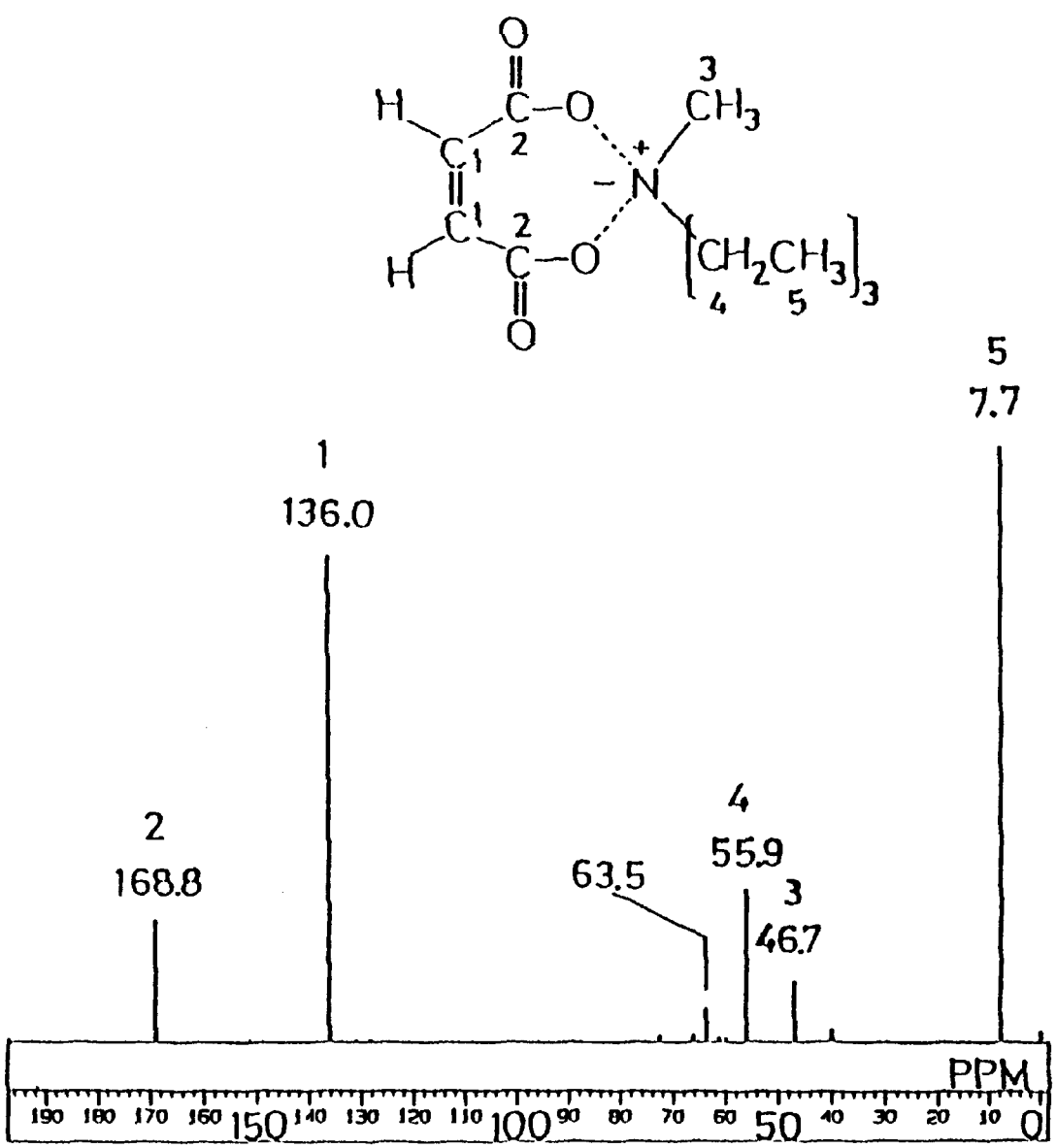
FIG. 5 is a diagram showing an NMR spectrum of an extract isolated from the electrolyte obtained by reaction of the above-mentioned monomer with the electrolyte salt, by means of Soxhlet Extraction using chloroform as a solvent.
Figure 6:
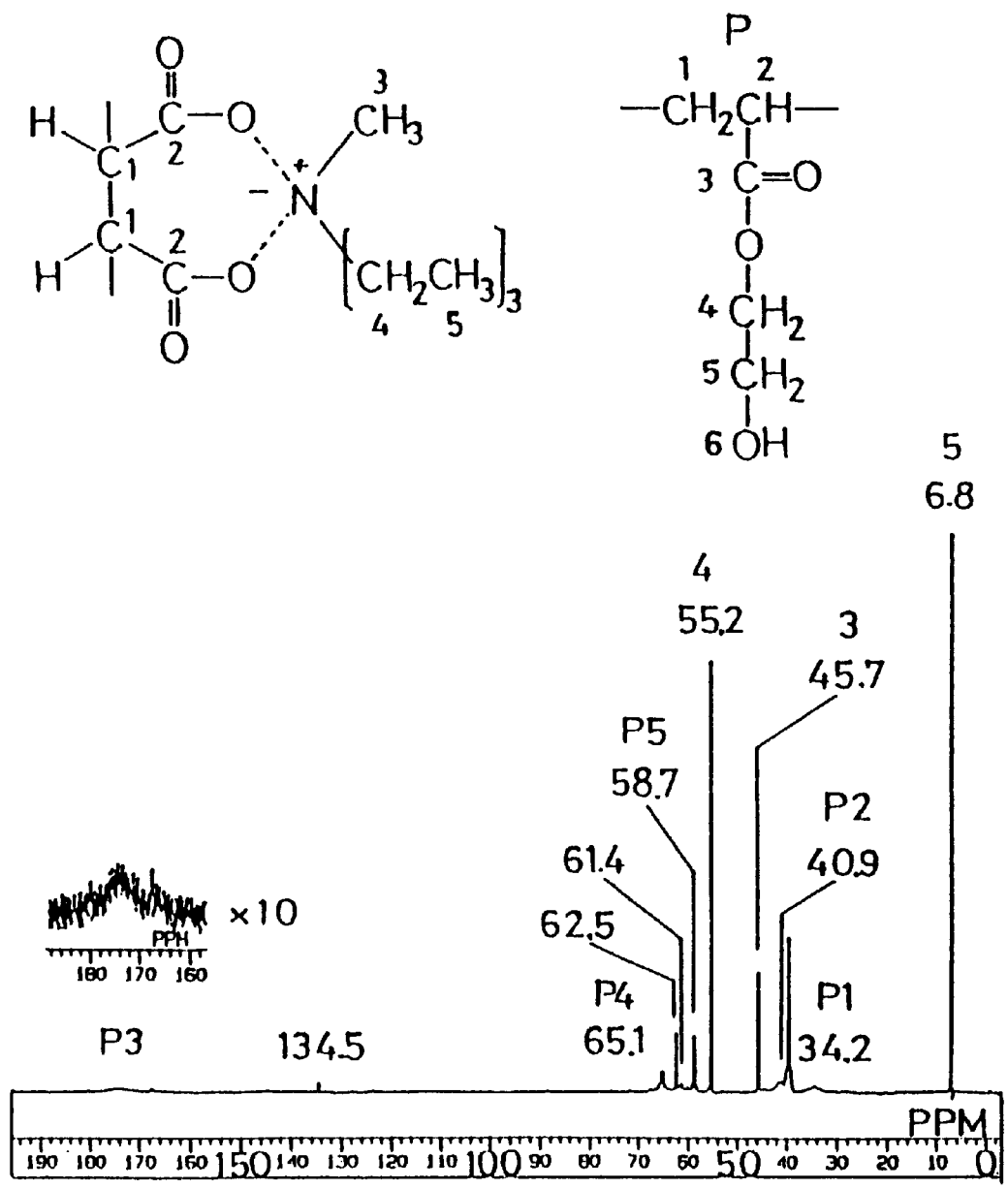
FIG. 6 is a diagram showing an NMR spectrum of a solid extract residue isolated from the electrolyte obtained by the reaction of the above-mentioned monomer with the electrolyte salt, by means of Soxhlet Extraction using chloroform as a solvent.

FIG. 3 and FIG. 4 show the NMR spectra of the hydroxyethyl acrylate and triethylmonomethylammonium hydrogen maleate, respectively, which are the starting materials for the polymerization reaction. FIG. 5 and FIG. 6 show the NMR spectra of an extract and a solid residue after extraction of the polymer electrolyte by Soxhlet Extraction using chloroform as the extraction solvent. On the NMR spectra in FIG. 3 and FIG. 4, peaks representing double bonds in the acrylolyl group and the maleic acid are observed at 131 ppm and 136 ppm, respectively, whereas these peaks have disappeared on the NMR spectra in FIG. 5 and FIG. 6. Based on these results, it is confirmed that cleavage reactions occur in the double bonds of the acrylolyl group in the hydroxyethyl acrylate and the maleic acid of the triethylmonomethylammonium hydrogen maleate.

The CHN analysis of the solid residue performed after Soxhlet Extraction is summarized in Table 2. Elemental compositions (ratio by atoms and ratio by weight) of hydroxyethyl acrylate (HEA) and triethylmonomethylammonium hydrogen maleate (MaH3E1M) are summarized in Table 3.

TABLE 2

|  | C | H | N |
|---|---|---|---|
| % by weight | 52.0 | 8.32 | 2.57 |

TABLE 3

| Elemental composition (ratio by atoms) | | | | |
|---|---|---|---|---|
| Compound | C | H | O | N |
| HEA | 5 | 8 | 3 | 0 |
| MaH3E1M | 11 | 21 | 4 | 1 |
| Elemental composition (ratio by weight) | | | | |
| HEA | 60 | 8 | 48 | 0 |
| MaH3E1M | 132 | 21 | 64 | 14 |

Assuming here that the samples for the above-mentioned analysis are constituted with the components at a molar ratio of MaH3E1M to HEA (X:1-X), the following equation is derived from the analysis value of nitrogen N:

$$100 \times 14X / \{(60+8+48)(1-X)+(132+21+64+14) \times X\} = 2.57$$

From the above equation, it is derived that X=0.27 and 1−X=0.73. Namely, the sample used here is constituted with hydroxyethyl acrylate and triethylmonomethylammonium hydrogen maleate at a molar ratio of 0.73:0.27, or roughly, 3:1. Further, the NMR spectrum in FIG. 6 of the extract obtained by the above-mentioned Soxhlet Extraction is identical with the NMR spectrum of the triethylmonomethylammonium hydrogen maleate in FIG. 4.

Based on the above analysis, it is determined that the electrolyte of this example is an ion-conductive polymer electrolyte having a polymer skeletal structure of a copolymer of the hydroxyethyl acrylate and triethylmonomethylammonium hydrogen maleate, in which ions dissociated from the triethylmonomethylammonium hydrogen maleate serve as the conductive species.

EXAMPLE 2

In this example, electrolytes having varying copolymerization ratios were produced from hydroxyethyl acrylate and triethylmonomethylammonium hydrogen maleate at various mixing ratios of these components.

First, respective solutions were prepared by dissolving triethylmonomethylammonium hydrogen maleate in the amounts as listed in Table 4 below, in each 1 mole (116 g) of hydroxyethyl acrylate. Next, benzyldimethylketal was added to each of the solutions as the polymerization initiator by 1%, and well dissolved while stirring. Then, each of the obtained mixtures was spread over a tray made of stainless steel in a thickness of 0.5 mm and irradiated with ultraviolet ray using a high-pressure mercury lamp at an intensity of 30 mW/cm$^2$ of 1 J in the air, and heated at 110° C. in the air for 1 hour. Then the heated mixture was dried in vacuum at 110° C. for 20 hours, thereby to remove the unreacted hydroxyethyl acrylate, and an ion-conductive polymer electrolyte sheet was obtained.

The structure of the above-mentioned electrolyte was examined by NMR spectrometry and CHN analysis in a manner similar to that in Example 1. As a result, it was found that the above-mentioned electrolyte forms a skeletal structure of a copolymer composed of hydroxyethyl acrylate and triethylmonomethylammonium hydrogen maleate at a molar ratio listed in Table 4, in which hydrogen maleate ions and triethylmonomethylammonium ions serve as the conductive species.

TABLE 4

| Sample | Added amount Mole number | (g) | Molar ratio of copolymer | Ionic conductivity (mS/cm) |
|---|---|---|---|---|
| E | 0.5 | 116 | 1/10 | 0.006 |
| F | 0.8 | 185 | 1/4 | 0.05 |
| G | 1.0 | 231 | 1/3 | 0.1 |
| H | 1.5 | 347 | 1/3 | 0.4 |
| I | 2.0 | 462 | 1/2 | 1.0 |
| J | 2.5 | 578 | 1/1 | 2.0 |
| K | 3.0 | 693 | 1/1 | 3.0 |
| L | 3.5 | 809 | | Not cured |

From the results shown in Table 4, it is concluded that a practically desirable conductivity can be obtained at the above-mentioned copolymerization ratio of larger than 0.1.

Figure 7:
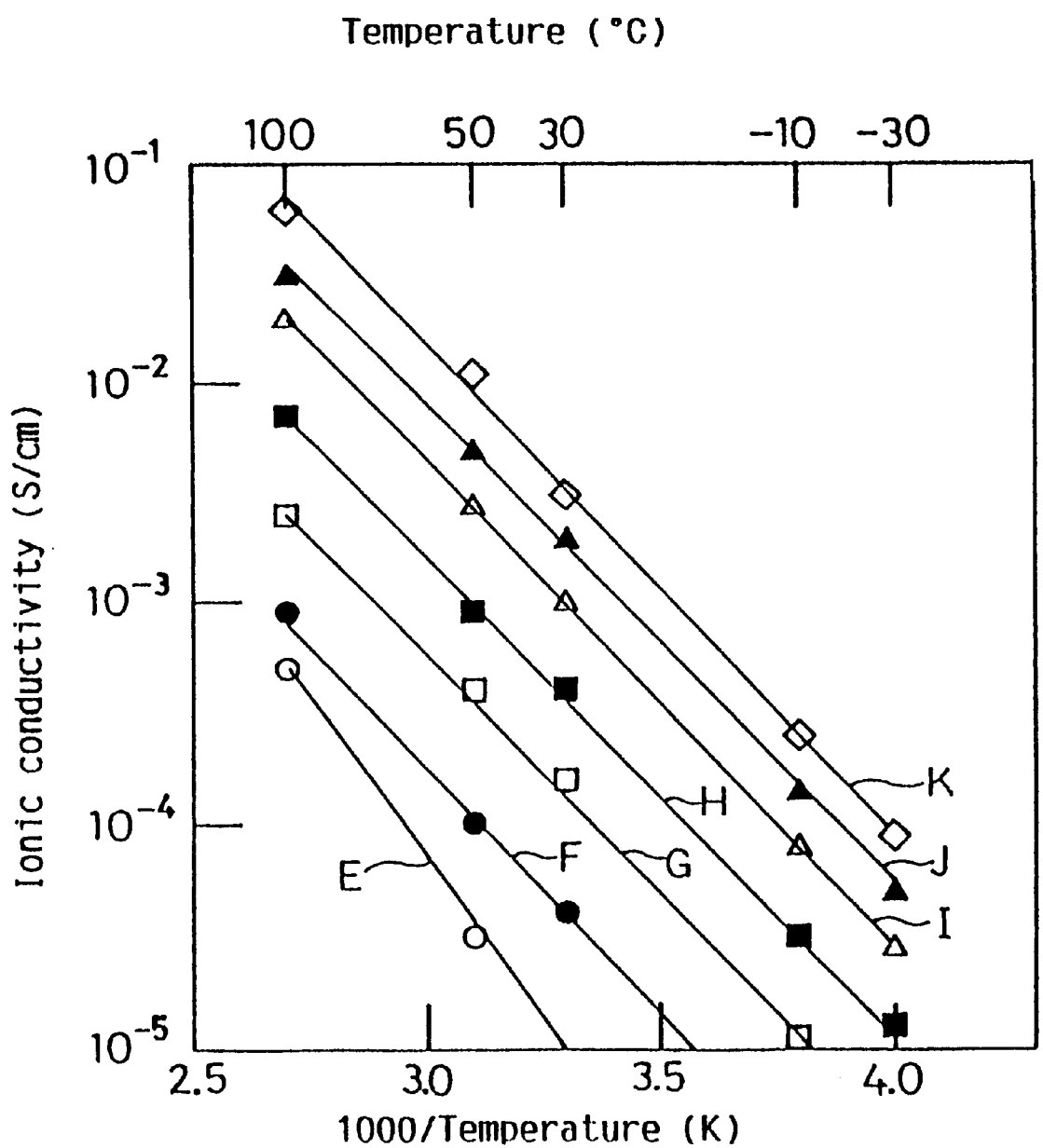
FIG. 7 is a diagram showing ionic conductivities of the various electrolytes in accordance with Example 2.

Then, the ionic conductivities of the respective polymer electrolytes prepared in the above-mentioned manner were measured by means of the known complex impedance method. The results of the measurements are shown in FIG. 7. FIG. 7 is a diagram representing Arrhenius Plots of the conductivities, wherein the ordinate represents logarithm of the ionic conductivity and the abscissa represents reciprocal number of the absolute temperature. As clearly shown in FIG. 7, the polymer electrolytes G, H, I, J and K in accordance with the present invention, having a molar ratio of the electrolyte salt of 50% or more, demonstrate a sufficiently high conductivity from the practical point of view, without a particularly large decrease in a desired temperature range.

Figure 8:
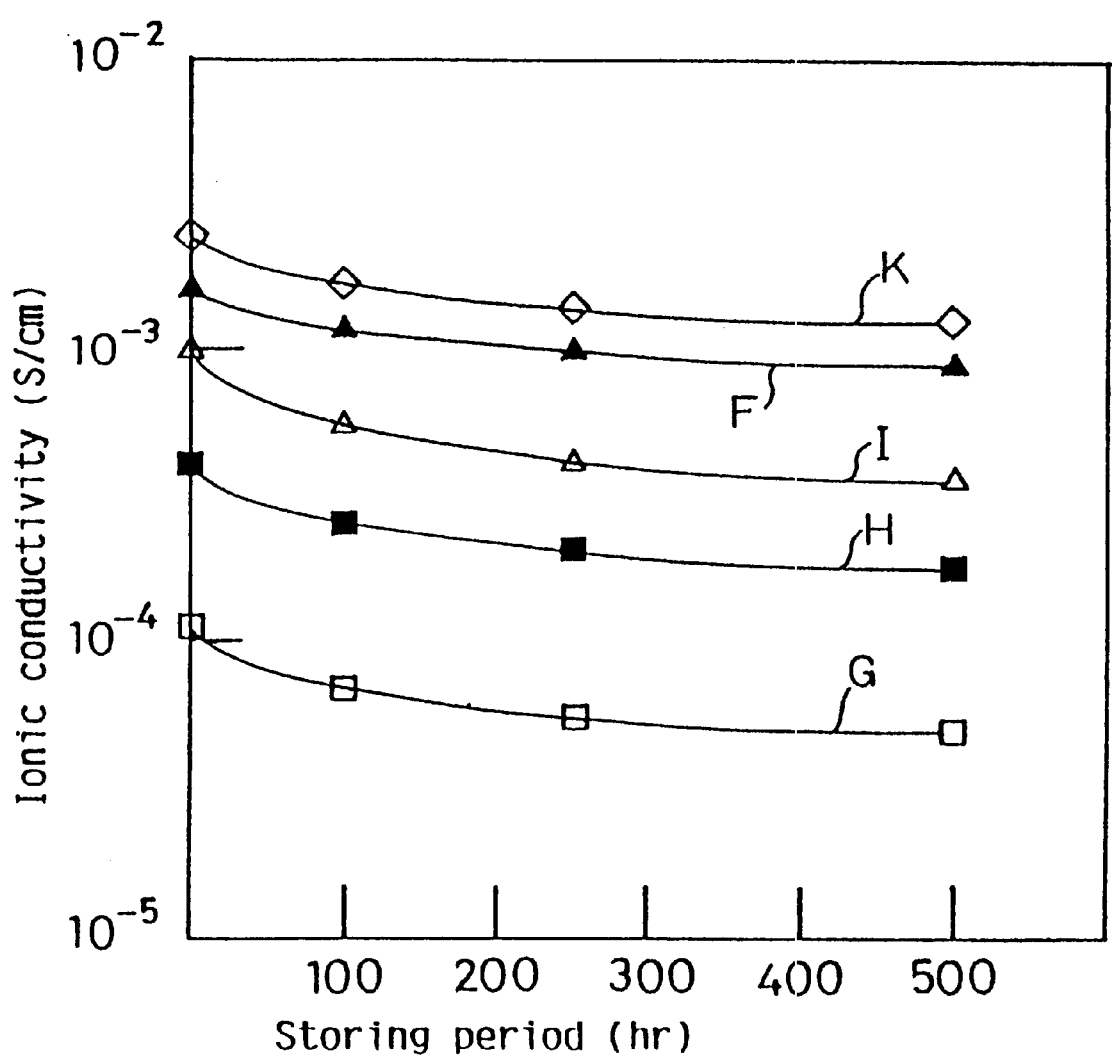
FIG. 8 is a diagram showing changes by aging in the ionic conductivities of the various electrolytes in accordance with Example 2.

Changes by aging in the ionic conductivities after storing of the electrolytes G, H, I, J and K in a non-sealed state under a nitrogen atmosphere at 110° C. were also measured in order to evaluate the reliability in the high temperature storing. FIG. 8 shows the results of the measurements. Sample electrolytes used in the evaluation are polymer electrolyte sheets each finished in a disk having a diameter of 13 mm and a thickness of 0.5 mm, and the measurement of the ionic conductivity was performed at 30° C. As clearly shown in FIG. 8, all of the sample electrolytes maintain an ionic conductivity of 50% of its initial value after storing at 110° C. for 500 hours, even under very severe conditions in the non-sealed state at high temperature.

EXAMPLE 3

In the above-mentioned Example 1, the reactions were performed by employing hydroxyethyl acrylate and triethylmonomethylammonium hydrogen maleate as the starting materials, with an addition of benzyldimethylketal as the polymerization initiator, and ultraviolet ray irradiation of 1 J was performed at an intensity of 30 mW/cm$^2$.

In this example, a description will be made on the ionic conductivities and the high temperature storing characteristics of the polymer electrolytes, under various reaction conditions at varying molecular weights of the obtained skeletal structures.

Procedures of the above-mentioned Example 1 were generally followed in this example, except for the changes in the added amount of benzyldimethylketal as the polymerization initiator and the intensity of the ultraviolet ray irradiation. The high temperature storing characteristics were evaluated based on the measurements of the conductivity after storing in the non-sealed state at 110° C. for 500 hours as in Example 1.

Table 5 below summarizes the results of the measurements.

TABLE 5

| Added amount of polymerization initiator (%) | Intensity of ultraviolet irradiation (J) | Average molecular weight | Conductivity(mS/cm) Initial | After 500 hours |
|---|---|---|---|---|
| 0.05 | 0.1 | 800 | 6.5 | 0.01 |
| 0.05 | 1.0 | 1,200 | 6.0 | 0.1 |
| 0.1 | 0.1 | 3,000 | 5.0 | 0.1 |
| 0.1 | 1.0 | 5,000 | 1.5 | 0.1 |
| 0.1 | 10.0 | 10,000 | 0.3 | 0.1 |
| 1.0 | 0.1 | 4,000 | 2.5 | 0.1 |
| 1.0 | 1.0 | 10,000 | 0.1 | 0.07 |
| 1.0 | 10.0 | 100,000 | 0.08 | 0.06 |
| 2.0 | 10.0 | 500,000 | 0.07 | 0.06 |
| 2.0 | 20.0 | 1,000,000 | 0.06 | 0.06 |
| 2.0 | 30.0 | 1,200,000 | 0.01 | 0.01 |

As clearly shown in Table 5, the electrolyte obtained with a low ultraviolet ray irradiation at a low concentration of the polymerization initiator has a small average molecular weight and a low storing reliability, but has a high initial conductivity. By contrast, the electrolyte having a large average molecular weight has a low initial conductivity but has a high storing reliability.

As a result, it is found that electrolytes having excellent characteristics are those having an average molecular weight of 5,000 or larger and 1,000,000 or smaller.

EXAMPLE 4

A description is made on an ionic conductivity and a reliability in high temperature storing of an ion-conductive polymer electrolyte constituted with vinylene carbonate and a maleic acid salt.

First, respective solutions were prepared by dissolving one of the maleic acid salts listed in Table 6 below, together with their amounts to be added, in 10 g of vinylene carbonate. Next, 100 mg of benzyldimethylketal was added to each of the solutions as the polymerization initiator, and well dissolved while stirring. Then, each of the obtained mixtures was spread over a tray made of stainless steel in a thickness of 0.5 mm and irradiated with ultraviolet ray using a high-pressure mercury lamp of 5 J in the air, and heated at 100° C. for 1 hour to obtain an ion-conductive polymer electrolyte sheet.

Temperature characteristics in the ionic conductivities of the respective polymer electrolytes prepared in the above-mentioned manner were evaluated by means of the known complex impedance method. The results of the measurements are shown in FIG. 9.

Figure 10:
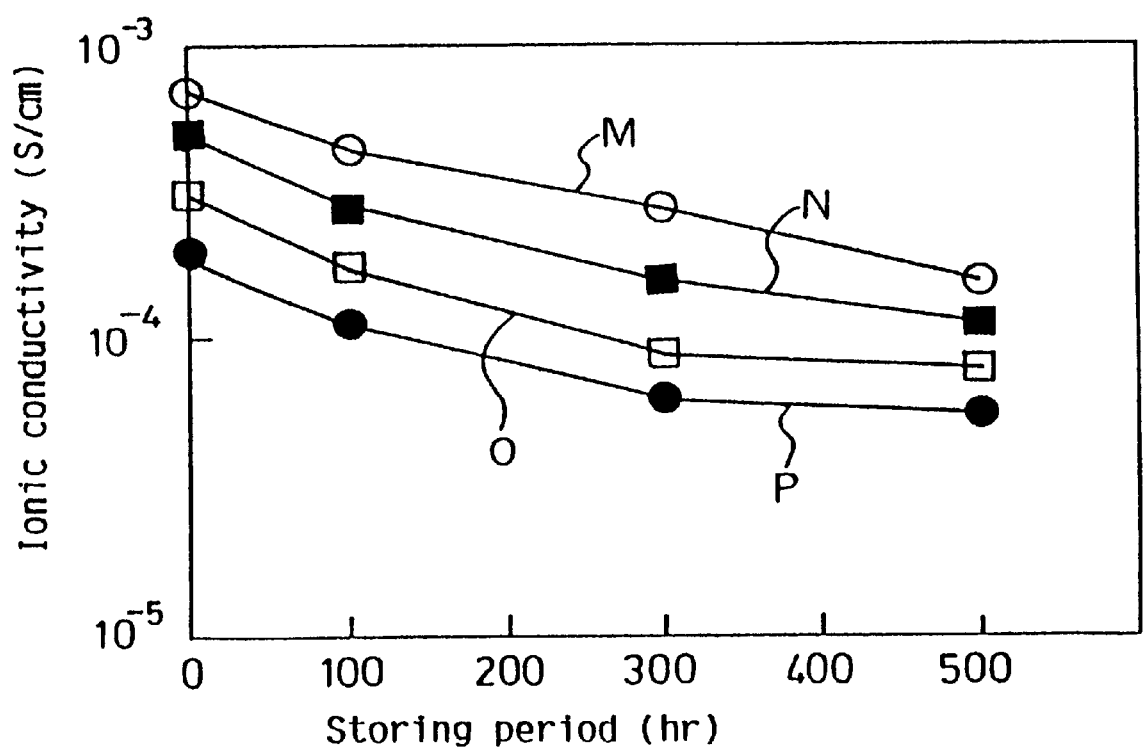
FIG. 10 is a diagram showing a high temperature storing characteristic in the ionic conductivity of the ion-conductive polymer electrolyte in accordance with Example 4.

Changes by aging in the ionic conductivities after storing of the electrolytes in a non-sealed state in the air at 110° C. were also measured in order to evaluate the reliability in the high temperature storing. FIG. 10 shows the results of the measurements. Sample electrolytes used in the evaluation are polymer electrolyte sheets each finished in a disk having a diameter of 13 mm and a thickness of 0.5 mm. The measurement of the ionic conductivity was performed at 30° C.

Figure 9:
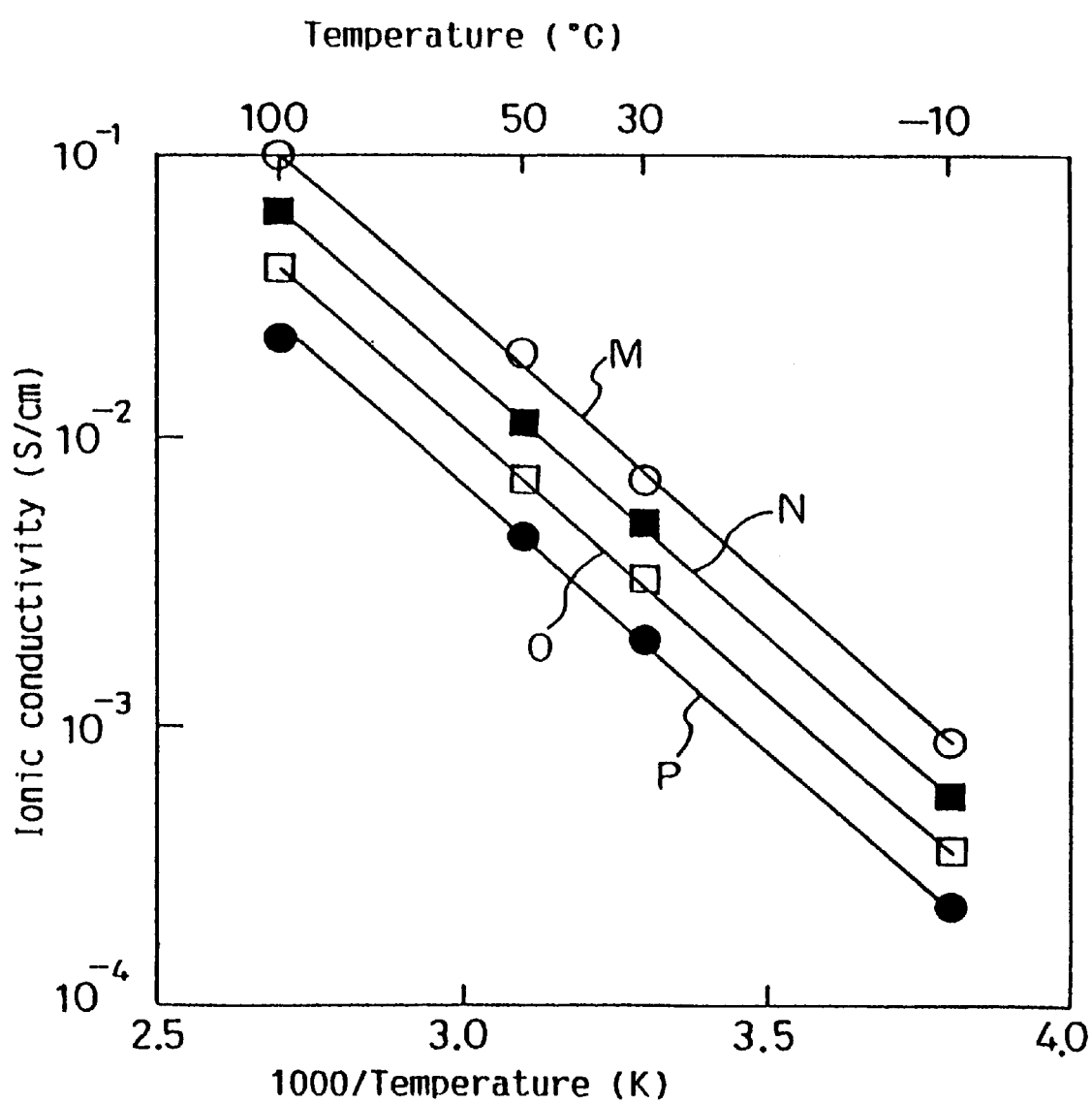
FIG. 9 is a diagram showing a temperature characteristic in the ionic conductivity of the ion-conductive polymer electrolyte in accordance with Example 4.

FIG. 9 is a diagram representing Arrhenius Plots of the conductivities, wherein the ordinate represents logarithm of the ionic conductivity and the abscissa represents reciprocal number of the absolute temperature. As clearly shown in FIG. 9, according to the present invention, it is possible to configure a polymer electrolyte having an unprecedently high conductivity of $1 \times 10^{-4}$ S/cm or higher at room temperature, or $1 \times 10^{-5}$ S/cm or higher even at $-10°$ C.

As clearly shown in FIG. 10, each of the obtained polymer electrolytes maintains an ionic conductivity of 20% of its initial value or higher after storing for 500 hours, even under very severe conditions in the non-sealed state at high temperature.

TABLE 6

| Sample | Salt | Amount (g) |
| --- | --- | --- |
| M | Triethylmonomethyl-ammonium hydrogen maleate | 30 |
| N | Trimethylmonoethyl-ammonium hydrogen maleate | 20 |
| O | Tetraethylammonium hydrogen maleate | 10 |
| P | N,N-Dimethylmorpholinium maleate | 10 |

In this example, benzyldimethylketal was used as the polymerization initiator and the polymerization was performed by irradiating the mixture with the ultraviolet ray. The polymerization reaction may alternatively be performed by heating the mixture. For instance, a polymer electrolyte was prepared by adding 10 mg of α,α'-azobisisobutyronitrile to the mixture in place of benzyldimethylketal as the polymerization initiator and heating the added mixture at 80° C. under a nitrogen gas atmosphere for 20 hours, and the thus prepared polymer electrolyte had similar technical advantages in the ionic conductivity and the high temperature storing characteristics to those obtained by the ultraviolet irradiation.

Aluminum Electrolytic Capacitor

EXAMPLE 5

A description will be made on the specific example of the aluminum electrolytic capacitor configured with the ion-conductive electrolyte as its driving electrolyte.

Figure 11:
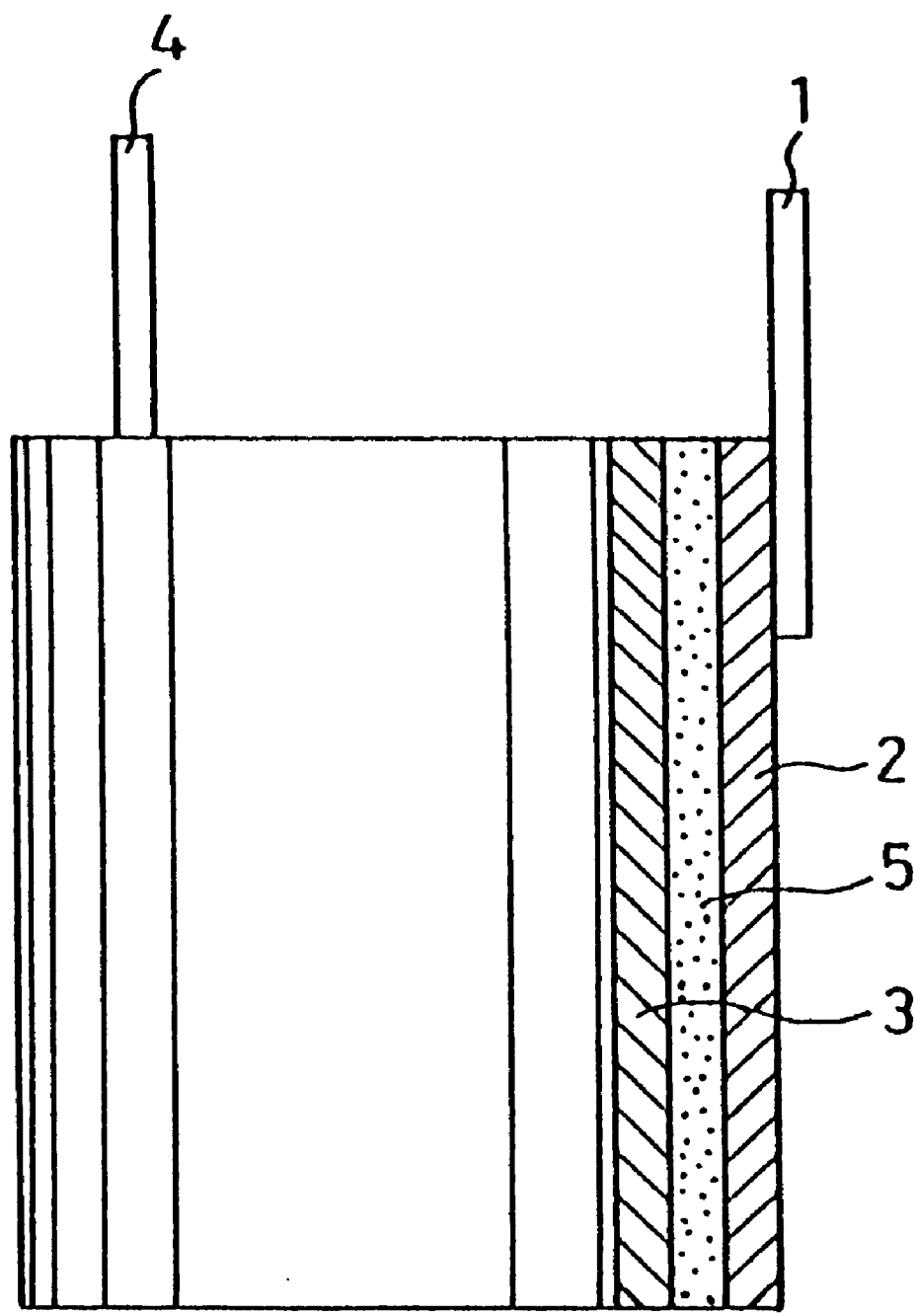
FIG. 11 is a front view of a partial cross-section of an aluminum electrolytic capacitor in accordance with Example 5.

FIG. 11 is a front view of a partial cross-section of the aluminum electrolytic capacitor configured with the electrolyte in accordance with the present invention. An anode connector 1 was spot-welded to one end of an electrode 2 made of an aluminum foil having a thickness of 0.05 mm, with etched pores having a diameter of about 1–5 microns and a size of 3 cm×100 cm. The electrode 2 was then anodized by immersing it in an aqueous solution of boric acid/sodium borate (boric acid: 80 g+sodium borate: 8 g/water: 1,000 ml) at a current flow of 30 A for 15 minutes, and a voltage of 600 V was applied for 5 hours to obtain the anode foil 2.

A cathode 3 was prepared by spot-welding a cathode connector 4 to one end of an electrode 3 made of an aluminum foil having a thickness of 0.05 mm, with etched pores having a diameter of about 1–5 microns and a size of 3 cm×100 cm.

A mother liquid of the polymer electrolyte was prepared in the following manner. First, 5 g of N,N-dimethylmorpholinium maleate and 0.5 g of water were dissolved in 10 g of hydroxyethyl acrylate. Next, 100 mg of benzyldimethylketal was added to this solution as a polymerization initiator, and well dissolved while stirring. Then, the thus obtained mother liquid was coated on both faces of the anode foil 2 in a thickness of 0.1 mm and irradiated with ultraviolet ray using a high-pressure mercury lamp at an irradiation intensity of 300 mW/cm$^2$ in the air for 20 seconds to form a layer 5 of the ion-conductive polymer electrolyte.

Subsequently, the cathode aluminum electrode 3 was adhered to the surface of the electrolyte layer 5 with pressure, which covered one face of the above-mentioned anode 2. Finally, the adhered assembly was rolled up in a spiral form, and an aluminum electrolytic capacitor "a" employing the ion-conductive polymer electrolyte was produced.

As a comparative example, a non-sealed type aluminum electrolytic capacitor "b" similar to the above-mentioned capacitor "a" was configured with a known electrolyte prepared by dissolving 20 g of ammonium 2-butyloctanedioate in 80 g of ethylene glycol. The same anode foil and cathode foil as those used in the aluminum electrolytic capacitor "a" were used and these were rolled up together, with a separator made of craft paper having a density of 0.7 g/cm$^3$, a thickness of 50 μm and a size of 3 cm×4 cm placed between the foils, followed by an impregnation of the electrolyte under a reduced pressure of 5 Torr at room temperature for 1 minute.

Aging process was performed for the capacitor element "a" and capacitor element "b" with an application of a voltage of 400 V at 80° C. for 2 hours and a voltage of 400 V at room temperature for 24 hours, respectively.

Figure 12:
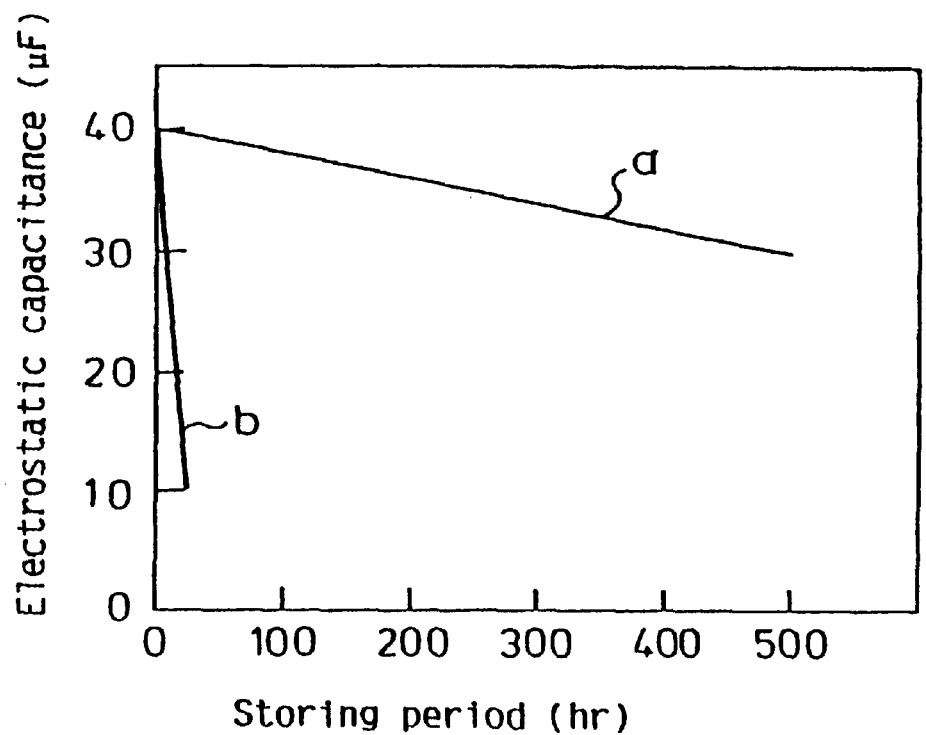
FIG. 12 is a diagram showing a high temperature storing characteristic in the static capacitance of the aluminum electrolytic capacitor in accordance with Example 5.
Figure 13:
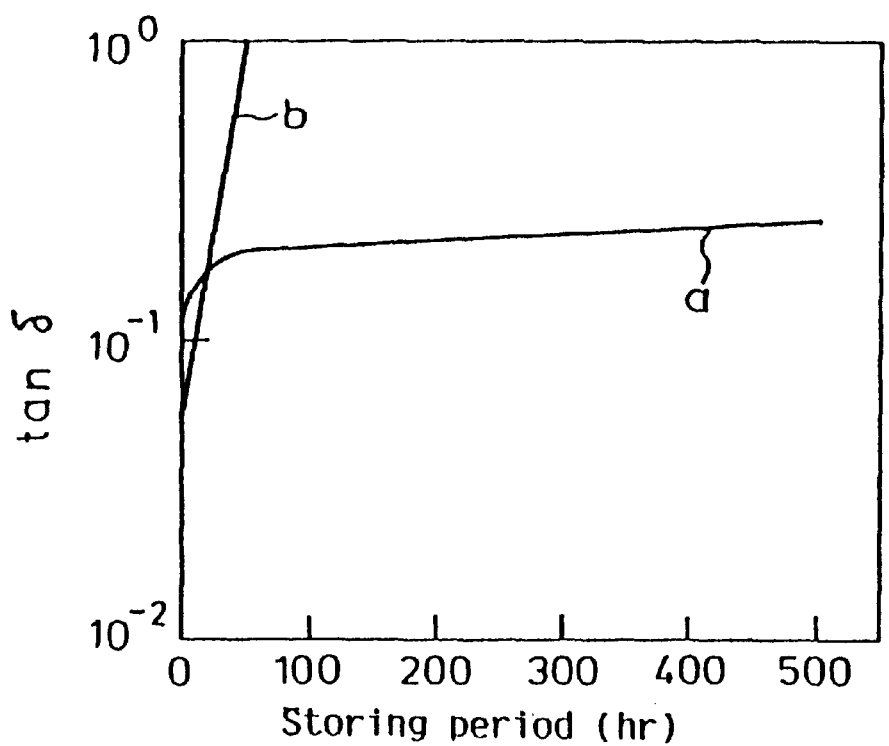
FIG. 13 is a diagram showing a high temperature storing characteristic of tanδ of the aluminum electrolytic capacitor in accordance with Example 5.

As an accelerated test for evaluating the stability of the electrolyte during the high temperature storing, changes by aging in electrostatic capacitance and tanδ of the aluminum electrolytic capacitor "a" of this example and the capacitor "b" of Comparative Example prepared in the above-mentioned manner were measured. The results of the measurements are shown in FIG. 12 and FIG. 13, respectively. The measurements were made at 30° C. and 120 Hz.

As clearly shown in FIG. 12 and FIG. 13, the characteristics of the capacitor "b" of Comparative Example, which employs the electrolyte comprising the conventionally used ethylene glycol as the solvent, deteriorate at early stage of high temperature storing. In contrast to this, the capacitor "a" configured with the polymer electrolyte of the present invention has a sufficient reliability.

EXAMPLE 6

In Example 5, the prepared polymer electrolyte had a water content of 3.2 wt %. In this example, an evaluation was made on the deterioration in working voltage and tanδ of the capacitor configured with an electrolyte having varying water contents as listed in Table 7 below, and an investigation was made on a suitable water content which is effective from the practical point of view.

Configuration and materials for the element of this example were the same as those used in Example 5. The working voltage was evaluated by measuring sparking voltage while flowing a constant current of 30 mA to the respective elements. Aging process was performed by applying the sparking voltage of the respective capacitor elements at 80° C. for 2 hours.

The high temperature storing tests were performed by storing the respective elements in their non-sealed states in the air at 105° C. for 100 hours as in the case of Example 4. The results of the measurements are summarized in Table 7 below.

As clearly shown in Table 7, the working voltage and tanδ of the electrolytes added with water are greatly improved as compared with those of the electrolyte with no addition of water (actual value of the water content is 0.3 wt %). However, when the added amount of water exceeds 10 wt %, there is a tendency of a lowering of the working voltage. These results show that when the electrolyte in accordance with the present invention is applied to an aluminum electrolytic capacitor, its working voltage and tanδ are greatly improved because of addition of water to the electrolyte in a range which does not exceeds 10 wt %.

In this example, although N,N-dimethylmorpholinium maleate was used as the electrolyte salt, it is also confirmed that the above-mentioned range by weight of the added amount of water is applicable to the other maleic acid salts employed in Example 1.

TABLE 7

| Water content (wt %) | Working voltage (V) | tan δ (%) Initial | tan δ (%) After storing |
|---|---|---|---|
| No addition (actual value: 0.3) | 230 | 36 | 40 |
| 1.0 | 380 | 12 | 20 |
| 2.0 | 400 | 10 | 20 |
| 5.0 | 450 | 8 | 20 |
| 8.0 | 420 | 6 | 20 |
| 10 | 400 | 5 | 20 |
| 15 | 200 | 4 | 25 |
| 20 | 100 | 3 | 25 |

EXAMPLE 7

In Example 5, the polymer electrolytes configured with hydroxyethyl acrylate and a maleic acid salt were employed for driving the capacitors. In this example, samples of the capacitors, which employ polymer electrolytes configured with vinylene carbonate and one of various carboxylic acid salts or dicarboxylic acid salts for driving the capacitors, will be described.

For configuring the polymer electrolytes of this example, 10 g of vinylene carbonate and a given amount of one of the salts listed in Table 8 and Table 9 below were employed. Configurations and materials other than these were the same as those used in Example 5. The working voltage was evaluated by measuring sparking voltage while flowing a constant current of 30 mA to the respective elements. Aging process was performed by applying the sparking voltage of the respective capacitor elements at 80° C. for 2 hours. The high temperature storing tests were performed by storing the respective elements in their non-sealed states in the air at 105° C. for 100 hours as in the case of Example 4, and increasing rates (deterioration) of tanδ of the respective stored elements are summarized in Table 8 and Table 9 below.

As clearly shown in Table 8 and Table 9, the respective aluminum electrolytic capacitors configured with the polymer electrolytes shown in this example have an excellent reliability.

In this example, water remaining in the respective polymer electrolytes was 1 wt % or less.

TABLE 8

| Salt | Amount (g) | Working voltage (V) | Tan δ (%) | Deterioration (%) |
|---|---|---|---|---|
| Triethylmonomethyl-ammonium hydrogen maleate | 30 | 120 | 0.5 | 30 |
| Trimethylmonoethyl-ammonium hydrogen maleate | 20 | 140 | 0.7 | 20 |
| Tetraethyl ammonium hydrogen maleate | 10 | 150 | 0.8 | 10 |
| N,N-dimethylmorpholinium hydrogen maleate | 10 | 200 | 1.0 | 10 |
| Triethylmonomethylammonium hydrogen oxalate | 10 | 150 | 0.8 | 10 |
| Triethylmonomethylammonium hydrogen adipate | 10 | 120 | 0.5 | 10 |
| Triethylmonomethylammonium hydrogen azelate | 10 | 130 | 0.7 | 10 |
| Tetramethylammonium benzoate | 10 | 150 | 0.8 | 10 |
| Tetramethylammonium formate | 10 | 110 | 0.5 | 30 |
| Tetramethylammonium dihydrogen citrate | 10 | 120 | 0.7 | 10 |
| Ditetramethylammonium succinate | 10 | 130 | 0.8 | 10 |

TABLE 9

| Salt | Amount (g) | Working voltage (V) | Tan δ (%) | Deterioration (%) |
|---|---|---|---|---|
| Tetramethylammonium salycilate | 20 | 140 | 0.8 | 30 |
| Ditetramethylammonium tartarate | 20 | 120 | 0.7 | 30 |
| Diammonium sebacate | 10 | 200 | 1.0 | 20 |
| Ammonium borodisalicilate | 10 | 400 | 3.0 | 20 |
| Ammonium γ-resorcilate | 10 | 400 | 3.0 | 10 |
| Ammonium lactate | 10 | 400 | 3.0 | 20 |
| Ammonium glycolate | 10 | 300 | 1.5 | 10 |
| Ammonium diphenylacetate | 10 | 300 | 1.5 | 10 |

Electric Double-Layer Capacitor

In the following paragraphs, a description will be made on cases wherein the ion-conductive polymer electrolyte of the present invention is applied to an electric double-layer capacitor.

Figure 14:
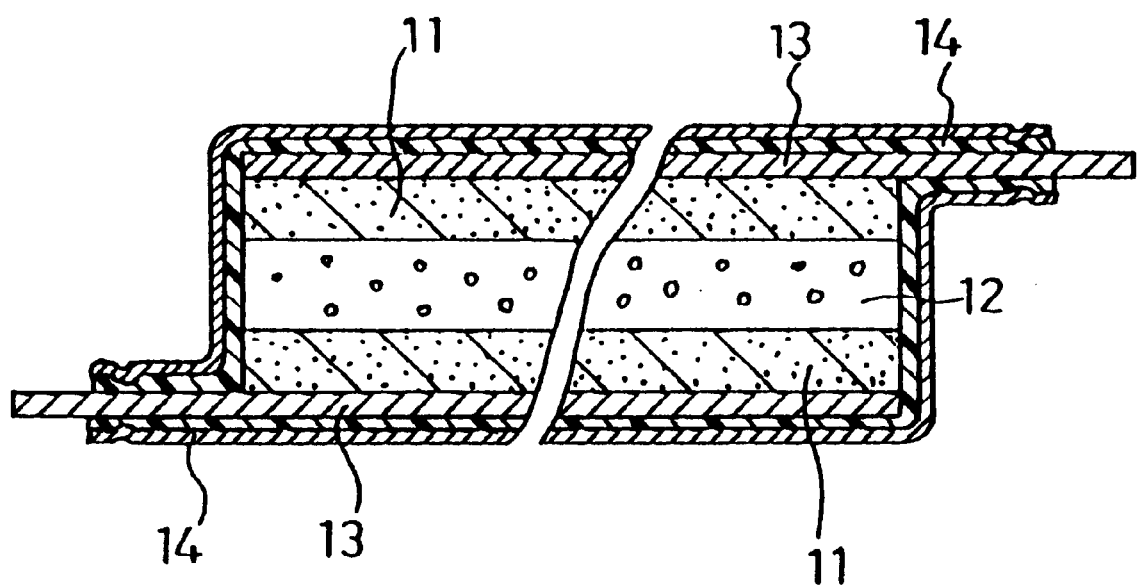
FIG. 14 is a longitudinal cross-sectional view of an electric double-layer capacitor in accordance with the embodiment of the present invention.

FIG. 14 is a cross-sectional view showing a representative configuration of the electric double-layer capacitor in accordance with the present invention. In FIG. 14, there is shown a polarizable electrode 11 comprising activated carbon and the ion-conductive polymer electrolyte, an electrolyte layer 12 constituted with the same material as the above-mentioned ion-conductive polymer electrolyte, and a collector electrode 13 made of a metal foil. For the metal material for the collector electrode, it is possible to employ any of aluminum, stainless steel and the like but it should not be limited to these materials.

Reference numeral 14 designates a sealing material which is generally made of a compound material prepared by thermally press-welding an electrically insulating film such as polypropylene and the like to an inner face of a metal foil such as aluminum.

By configuring the electrolyte layer 12 with a carrier of a porous film made of an electrically insulating material such as polypropylene and the like, it is possible to improve its mechanical strength and short-circuit-resistant property. The electric double-layer capacitor will specifically be described in concrete examples as follows.

EXAMPLE 8

First, a description will be made on the preparation of the ion-conductive polymer electrolyte of this example and the polarizable electrode comprising the ion-conductive polymer electrolyte and the activated carbon.

A mixture composed of 10 g (0.086 mol) of hydroxyethyl acrylate and 20 g (0.087 mol) of triethylmonomethylammonium hydrogen maleate was stirred well and spread over a tray of stainless steel in a thickness of 0.5 mm.

Another mixture composed of 10 g of activated carbon having an average particle diameter of 2 μm, a specific surface area of 2,500 m$^2$/g, and an average diameter of micropores of 20 angstrom, 10 g of hydroxyethyl acrylate, 20 g of triethylmonomethylammonium hydrogen maleate, and 35 g of methylethylketone was placed in a ball mill made of alumina, stirred well and pulverized for 24 hours. Then, the pulverized mixture was spread over a tray of stainless steel in a size of 20 cm×80 cm.

Two mixture sheets thus obtained were irradiated with electron beam under a nitrogen gas atmosphere to obtain an electrolyte sheet and an electrode sheet, respectively. After irradiation of the electron beam, the electrode sheet was stood still under a reduced pressure of 10 mmHg at 110° C. for 1 hour, thereby to remove remaining methylethylketone in the sheet. Conditions employed in the electron beam irradiation included an accelerating voltage of 750 keV for both, and irradiation doses of 3 Mrad and 8 Mrad for the electrolyte sheet and the electrode sheet, respectively.

The electrode sheet thus prepared was cut into two electrodes having a size of 20 cm×10 cm, and the electrolyte sheet was cut into an electrolyte layer having a size of 21 cm×11 cm. On both faces of the electrolyte layer, the above-mentioned electrodes were adhered with pressure, respectively. After adhering an aluminum foil having a thickness of 50 μm to the rear face of the above-mentioned electrode, the whole of the laminated assembly was sealed with a sealing material made of a compound material prepared by thermally press-welding a polypropylene film having a thickness of 0.1 mm on the inner face of the aluminum foil, thereby to configure the electric double layer capacitor in accordance with the present invention. The sealing was performed by pressing the edges of the sealing material at 170° C. for 5 seconds.

Figure 15:
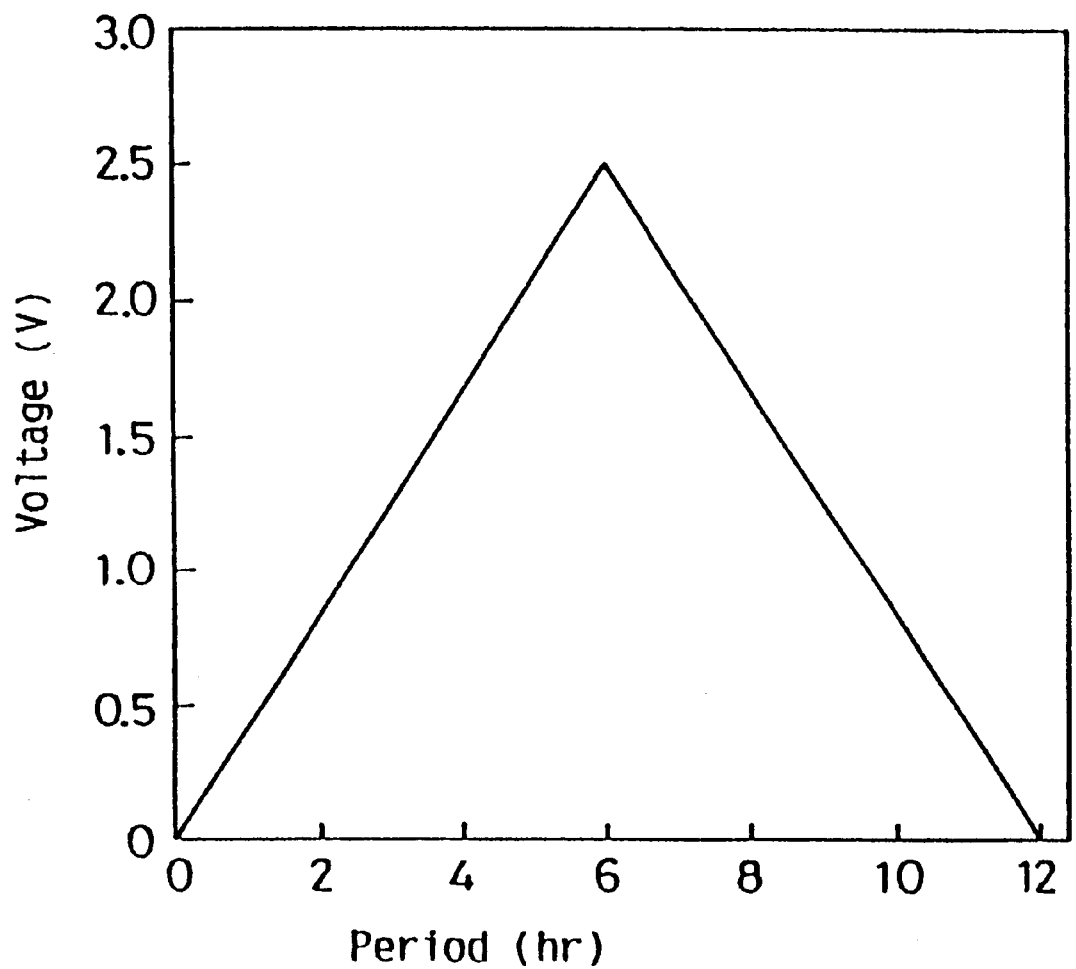
FIG. 15 is a diagram showing a charge/discharge curve of the electric double-layer capacitor in accordance with Example 8.

A series of charge/discharge tests were performed on the capacitor thus prepared at a constant current of 10 mA from 0 to 2.5 V. The charge/discharge curve of the capacitor at the 100th cycle of the tests is shown by the diagram in FIG. 15. From the results of the tests, the discharge capacity of the capacitor per 1 g of the activated carbon was calculated as 38 F. Equations used in the calculation are represented as follows:

Discharge quantity of electricity $$= 10 \text{ mA} \times 6 \text{ hours}$$
$$= 60 \text{ mA} \cdot \text{hr}$$
$$= 216 \text{ C}$$

Capacitance of the capacitor $$= 216 \text{ C}/2.5 \text{ V}$$
$$= 86 \text{ F}$$

Quantity of the activated carbon existing in the electrode $$= 2 \times 10 \text{ g} \times 20 \text{ cm} \times 10 \text{ cm}/(20 \text{ cm} \times 80 \text{ cm})$$
$$= 2.5 \text{ g}$$

Discharge capacity per 1 g of the activated carbon $$= 86 \text{ F}/2.5 \text{ g}$$
$$= 35 \text{ F}/\text{g}$$

Figure 16:
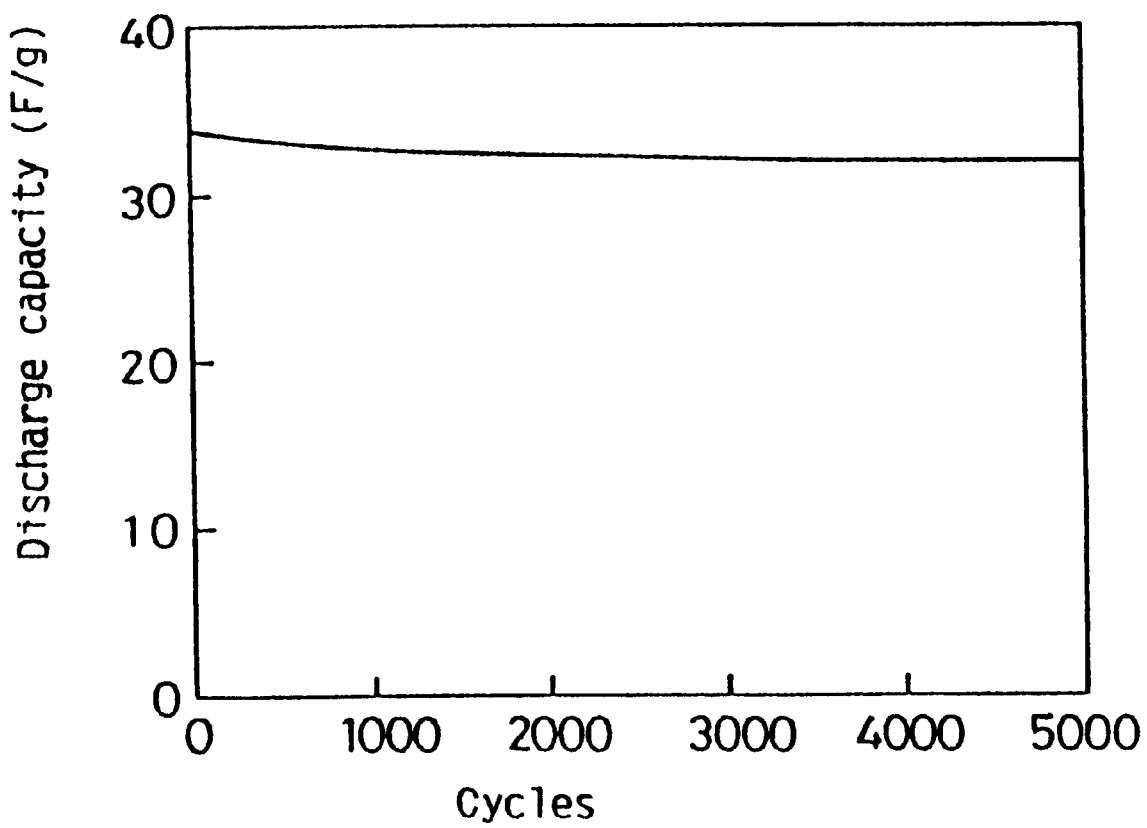
FIG. 16 is a diagram showing a charge/discharge cycle characteristic in the discharge capacitance of the electric double-layer capacitor in accordance with Example 8.

Next, a measurement was made on the change by the number of cycles in the discharge capacity of the sample capacitor obtained in the above-mentioned charge/discharge test in the air at 85° C. The charge/discharge test was performed at a constant current of 10 mA. The result is shown by the diagram in FIG. 16. In FIG. 16, the abscissa represents the number of cycles and the ordinate represents the discharge capacity. As clearly shown in FIG. 16, the capacitor element of this example does not demonstrate a serious deterioration during the test up to 5,000 cycles.

In this example, although polymerization reaction was performed by the irradiation of the electron beam, it is alternatively possible to perform the polymerization reaction by heating. For instance, a capacitor configured with a polymer electrolyte sheet and an electrode sheet prepared by adding 30 mg of α, α'-azobisisobutyronitrile to the mixture as the polymerization initiator and curing the added mixture by heating at 80° C. under a nitrogen gas atmosphere for 20 hours demonstrated similar characteristics in the electrostatic capacitance and in the charge/discharge cycle test.

EXAMPLE 9

In this example, a description will be made on the ion-conductive polymer electrolyte and a method for preparing a polarizable electrode comprising the ion-conductive polymer electrolyte and activated carbon.

A mixture composed of 10 g (0.12 mol) of vinylene carbonate and 20 g (0.098 mol) of trimethylmonoethylammonium hydrogen maleate was stirred well and spread over a tray of stainless steel in a thickness of 0.5 mm.

Another mixture composed of 10 g of activated carbon having an average particle diameter of 2 μm, a specific surface area of 2,500 m²/g and an average diameter of micropores of 20 angstrom, 10 g of vinylene carbonate, 20 g of trimethylmonoethylammonium hydrogen maleate, and 35 g of methylethylketone was placed in a ball mill made of alumina, stirred well and pulverized for 24 hours. Then the pulverized mixture was spread over a tray of stainless steel in a size of 20 cm×80 cm.

Two mixture sheets thus obtained were irradiated with electron beam under a nitrogen gas atmosphere to obtain an electrolyte sheet and an electrode sheet, respectively. After irradiation of the electron beam, the electrode sheet was stood still under a reduced pressure of 10 mmHg at 110° C. for 1 hour, thereby to remove remaining methylethylketone in the sheet. Conditions employed in the electron beam irradiation included an accelerating voltage of 750 keV for both, and irradiation doses of 3 Mrad and 8 Mrad for the electrolyte sheet and the electrode sheet, respectively.

The electrode sheet thus prepared was cut into two electrodes having a size of 20 cm×10 cm, and the electrolyte sheet was cut into an electrolyte layer having a size of 21 cm×11 cm. On both faces of the electrolyte layer, the above-mentioned electrodes were adhered with pressure, respectively. After adhering an aluminum foil having a thickness of 50 μm to the rear face of the above-mentioned electrode, the whole of the laminated assembly was sealed with a sealing material made of a compound material prepared by thermally press-welding a polypropylene film having a thickness of 0.1 mm on the inner face of the aluminum foil, thereby to configure the electric double layer capacitor in accordance with the present invention. The sealing was performed by pressing the edges of the sealing material at 170° C. for 5 seconds.

Figure 17:
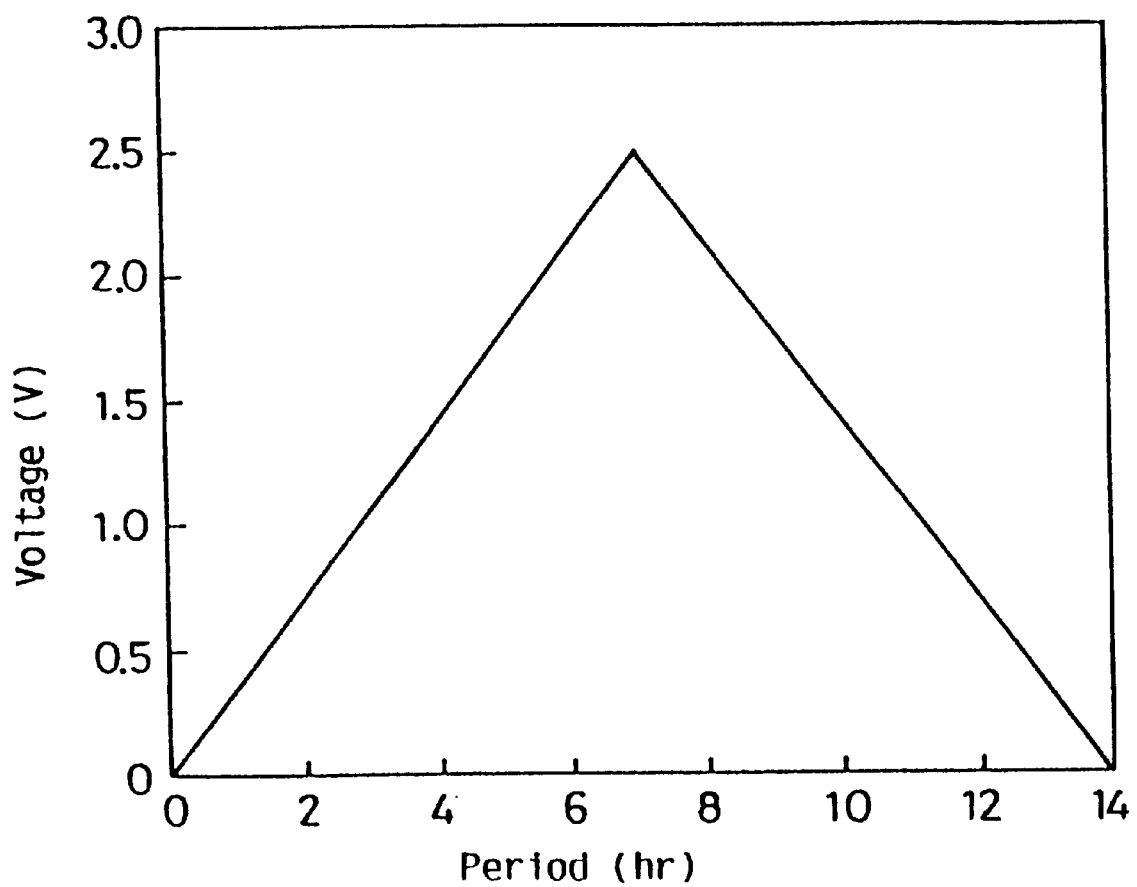
FIG. 17 is a diagram showing a charge/discharge curve of the electric double-layer capacitor in accordance with Example 9.

A series of charge/discharge tests were performed on the capacitor thus prepared at a constant current of 10 mA from 0 to 2.5 V. The charge/discharge curve of the capacitor at the 100th cycle of the tests is shown by the diagram in FIG. 17. From the results of the tests, the discharge capacity of the capacitor per 1 g of the activated carbon was calculated as 40 F.

Figure 18:
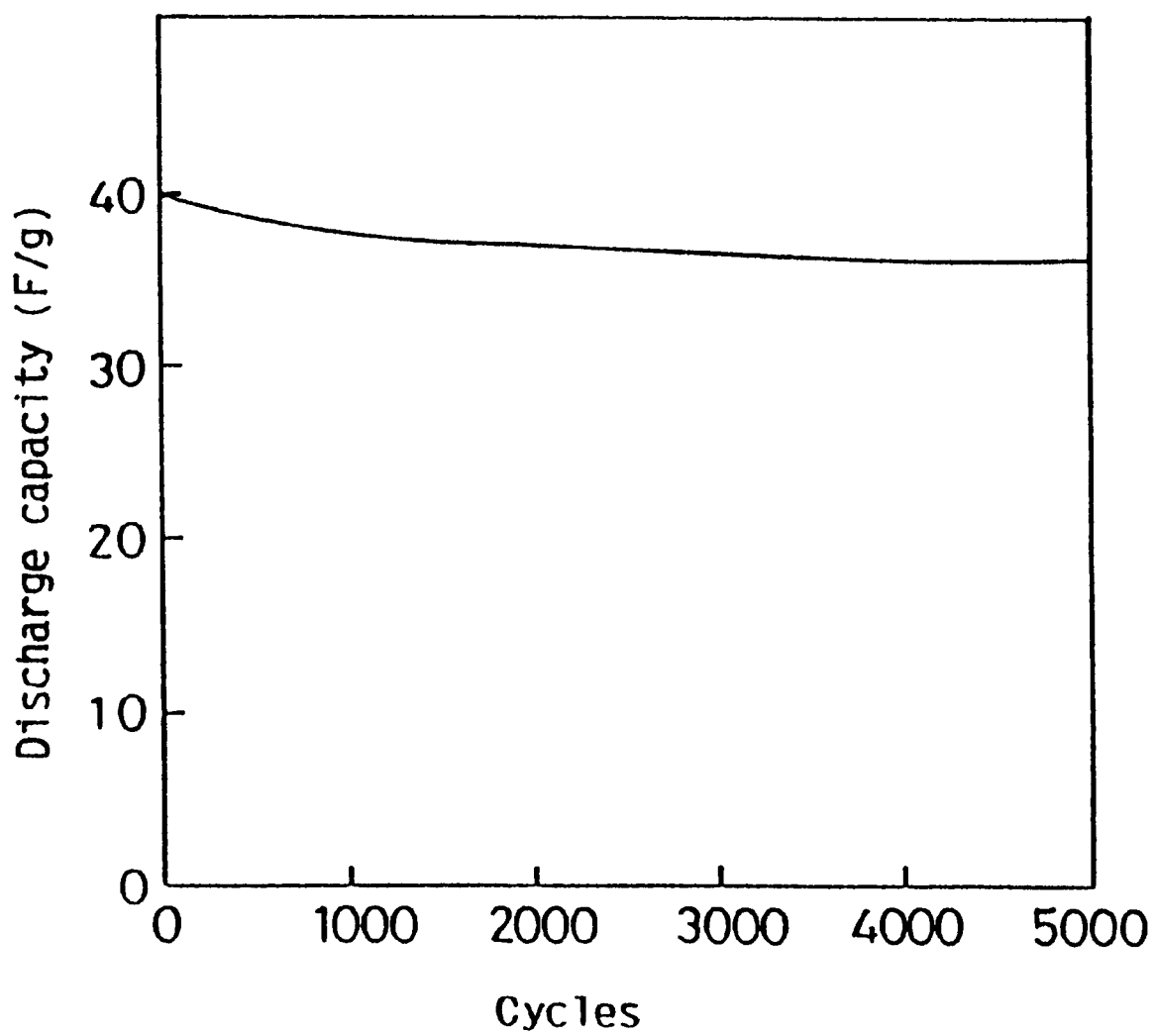
FIG. 18 is a diagram showing a charge/discharge cycle characteristic in the discharge capacitance of the electric double-layer capacitor in accordance with Example 9.

Next, a measurement was made on the change by the cycle number in the discharge capacity of the sample capacitor obtained in the above-mentioned charge/discharge test in the air at 85° C. The charge/discharge test was performed at a constant current of 10 mA. The result is shown by the diagram in FIG. 18. In FIG. 18, the abscissa represents the number of cycles and the ordinate represents the discharge capacity. As clearly shown in FIG. 18, the capacitor element of this example does not demonstrate a serious deterioration during the test up to 5,000 cycles.

In this example, although polymerization reaction was performed by irradiation of the electron beam, it is alternatively possible to perform the polymerization reaction by heating. For instance, a capacitor configured with a polymer electrolyte sheet and an electrode sheet prepared by adding 30 mg of α, α'-azobisisobutyronitrile to the mixture as the polymerization initiator and curing the added mixture by heating at 80° C. under a nitrogen gas atmosphere for 20 hours demonstrated similar characteristics in the electrostatic capacitance and in the charge/discharge cycle test.

EXAMPLE 10

In the polymer electrolyte shown in Example 8, 1 mole of the maleic acid salt was used for 1 mole of the polymer raw material, hydroxyethyl acrylate, and in Example 9, 0.82 mole of the maleic acid salt was used for 1 mole of the polymer raw material, vinylene carbonate, respectively.

In this example, capacitors are configured by changing the species of the employed polymer raw material and the mixing ratio, and the effect of the change was evaluated by the discharge capacity at the 100th cycle in a similar manner to those in the previous examples. The configuration identical to those in Examples 8 and 9 was adopted except for the composition of the polymer electrolyte. The results are summarized in Table 10 below.

In Table 10, the following abbreviations are used to represent the corresponding compounds.

AHE: hydroxyethyl acrylate

TV: vinylene carbonate

Ma3E1M: triethylmonomethylammonium hydrogen maleate

Ma3M1E: trimethylmonoethylammonium hydrogen maleate

Ma4E: tetraethylammonium hydrogen maleate

MaA: ammonium hydrogen maleate

TABLE 10

| Polymer raw material (mixed amount 10 g) | Maleic acid salt, mixed amount (g) | Salt/polymer raw material (molar ratio) | Discharge capacity (F/g) |
|---|---|---|---|
| AHE | Ma3E1M | 5 | 0.25 | 1 or less |
| AHE | Ma3E1M | 8 | 0.40 | 5 |
| AHE | Ma3E1M | 10 | 0.5 | 30 |
| AHE | Ma3E1M | 30 | 1.5 | 35 |
| AHE | Ma3M1E | 7 | 0.4 | 7 |
| AHE | Ma3M1E | 10 | 0.57 | 32 |
| TV | Ma3M1E | 5 | 0.21 | 1 or less |
| TV | Ma3M1E | 15 | 0.64 | 25 |
| TV | Ma4M | 10 | 0.46 | 8 |
| TV | Ma4M | 15 | 0.68 | 35 |
| TV | Ma4M | 20 | 0.92 | 42 |
| TV | MaA | 5 | 0.36 | 2 |
| TV | MaA | 7 | 0.51 | 30 |
| TV | MaA | 10 | 0.72 | 35 |

As clearly shown in Table 10, the copolymer electrolyte which employs 0.5 mole or more of the maleic acid salt for one mole of the polymer raw material can give a capacitor having a satisfactory capacitance.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An electrolytic capacitor comprising: a cathode made of aluminum, an anode having a dielectric substance layer made of aluminum oxide, and an electrolyte layer interposed between both electrodes, wherein said electrolyte is a solid ion-conductive polymer electrolyte comprising: (a) a copolymer comprising the polymerization product of anions of an electrolyte salt co-monomer having a polymerizable double bond, and at least one monomer selected from the group consisting of a hydroxyalkyl acrylate, a hydroxyalkyl methacrylate, and vinylene carbonate; and (b) at least one electrolyte salt different from said electrolyte salt co-monomer and selected from the group consisting of an ammonium carboxylate, an ammonium dicarboxylate, a morpholinium dicarboxylate, a quaternary ammonium carboxylate, and a quarternary ammonium dicarboxylate; wherein said copolymer contains at least cations of said electrolyte salt co-monomer as a conductive species.

2. The electrolytic capacitor according to claim 1, wherein said electrolyte salt co-monomer is selected from a maleate and a fumarate.

3. The electrolytic capacitor according to claim 2, wherein said electrolyte salt co-monomer is selected from the group consisting of quarternary ammonium hydrogen maleate, N,N-dimethylmorpholinium hydrogen maleate, quaternary ammonium hydrogen fumarate, and N,N-dimethylmorpholinium hydrogen fumarate.

4. The electrolytic capacitor according to claim 1, wherein the molar ratio of said electrolyte salt co-monomer to said monomer of said copolymer is at least 0.1:1, and the average molecular weight of said copolymer is from at least 1,000 up to and including 1,000,000.

5. The electrolytic capacitor according to claim 1, further comprising water in an amount which does not exceed 10 wt %.

6. An electric double-layer capacitor comprising: a pair of polarizable electrodes containing activated carbon, an electrolyte layer interposed between said electrodes, wherein said electrolyte is a solid ion-conductive polymer electrolyte comprising: (a) a copolymer comprising the polymerization product of anions of an electrolyte salt co-monomer having a polymerizable double bond, and at least one monomer selected from the group consisting of a hydroxyalkyl acrylate, a hydroxyalkyl methacrylate and vinylene carbonate; and (b) at least one electrolyte salt different from said electrolyte salt co-monomer and selected from the group consisting of an ammonium carboxylate, an ammonium dicarboxylate, a morpholinium dicarboxylate, a quaternary ammonium carboxylate, and a quarternary ammonium dicarboxylate; wherein said copolymer contains at least cations of said electrolyte salt co-monomer as a conductive species.

7. The electrolytic capacitor according to claim 6, wherein said electrolyte salt co-monomer is selected from a maleate and a fumarate.

8. The electrolytic capacitor according to claim 7, wherein said electrolyte salt co-monomer is selected from the group consisting of quarternary ammonium hydrogen maleate, N,N-dimethylmorpholinium hydrogen maleate, quaternary ammonium hydrogen fumarate, and N,N-dimethylmorpholinium hydrogen fumarate.

9. The electrolytic capacitor according to claim 6, wherein the molar ratio of said electrolyte salt co-monomer to said monomer of said copolymer is at least 0.1:1, and the average molecular weight of said copolymer is from at least 1,000 up to and including 1,000,000.

10. The electrolytic capacitor according to claim 9, wherein the molar ratio of said electrolyte salt co-monomer to said monomer of said copolymer is at least 0.5:1.

11. The electrolytic capacitor according to claim 6, further comprising water in an amount which does not exceed 10 wt %.

* * * * *